US008150775B2

(12) United States Patent
Burchetta et al.

(10) Patent No.: US 8,150,775 B2
(45) Date of Patent: *Apr. 3, 2012

(54) COMPUTERIZED TRANSACTION BARGAINING SYSTEM AND METHOD

(75) Inventors: James D. Burchetta, New York, NY (US); Charles S. Brofman, Waccabuc, NY (US)

(73) Assignee: Cybersettle Holdings, Inc., White Plains, NY (US)

( * ) Notice: Subject to any disclaimer, the term of this patent is extended or adjusted under 35 U.S.C. 154(b) by 1101 days.

This patent is subject to a terminal disclaimer.

(21) Appl. No.: 11/981,469

(22) Filed: Oct. 30, 2007

(65) Prior Publication Data

US 2008/0126254 A1 May 29, 2008

Related U.S. Application Data

(60) Continuation of application No. 11/549,437, filed on Oct. 13, 2006, now Pat. No. 7,831,523, which is a division of application No. 10/683,821, filed on Oct. 10, 2003, now Pat. No. 7,840,440, which is a continuation-in-part of application No. 10/683,819, filed on Oct. 10, 2003, now Pat. No. 7,249,114, which is a continuation-in-part of application No. 09/370,394, filed on Aug. 6, 1999, now Pat. No. 6,954,741, which is a continuation-in-part of application No. 09/130,154, filed on Aug. 6, 1998, now Pat. No. 6,330,551.

(51) Int. Cl.
*G06Q 50/00* (2012.01)
*G06Q 20/00* (2012.01)

(52) U.S. Cl. ....................................... 705/80

(58) Field of Classification Search ................... 705/1.1, 705/4, 37, 80, 500, 26.3
See application file for complete search history.

(56) References Cited

U.S. PATENT DOCUMENTS

| | | | |
|---|---|---|---|
| 3,573,747 A | 4/1971 | Adams et al. | 705/37 |
| 3,581,072 A | 5/1971 | Nymeyer | 705/37 |
| 5,077,665 A | 12/1991 | Silverman et al. | 705/37 |
| 5,329,589 A | 7/1994 | Fraser et al. | 379/91.02 |
| 5,495,412 A | 2/1996 | Thiessen | 705/1 |

(Continued)

FOREIGN PATENT DOCUMENTS

JP 2002-092376 3/2002

(Continued)

OTHER PUBLICATIONS

Stevenson, R.L., "Treasure Island," Chapter 6, 1882, from http://www.gutenberg.org/dirs/1/2/120/120.txt.*

(Continued)

*Primary Examiner* — Nicholas D Rosen
(74) *Attorney, Agent, or Firm* — William S. Frommer; Brian M. McGuire; Frommer Lawrence & Haug LLP

(57) ABSTRACT

A method and system for automated bargaining in a round by round manner is disclosed. The method and system are capable of multiple rounds. The method and system are used in testing non-equal values in normal rounds for satisfaction of a predetermined criterion. If the criterion is not satisfied in the normal rounds, power round values are tested for satisfaction of a power round criterion. If the power round criterion is satisfied, a binding bargained payment is calculated. Additional options involve an automated facilitator, windfalls to initiators, automatic payment initiation, multiparty aggregation and automatic agreement document generation.

34 Claims, 7 Drawing Sheets

U.S. PATENT DOCUMENTS

| | | | | |
|---|---|---|---|---|
| 5,508,912 | A | * | 4/1996 | Schneiderman ................. 705/3 |
| 5,548,647 | A | * | 8/1996 | Naik et al. .................... 704/200 |
| 5,668,953 | A | | 9/1997 | Sloo ................................. 705/1 |
| 5,689,652 | A | | 11/1997 | Lupien et al. ................... 705/37 |
| 5,699,089 | A | * | 12/1997 | Murray ........................ 715/823 |
| 5,764,890 | A | * | 6/1998 | Glasser et al. ................. 726/11 |
| 5,781,901 | A | * | 7/1998 | Kuzma ................................ 1/1 |
| 5,794,207 | A | | 8/1998 | Walker et al. .................... 705/1 |
| 5,890,138 | A | | 3/1999 | Godin et al. .................... 705/26 |
| 5,895,450 | A | | 4/1999 | Sloo ................................. 705/1 |
| 5,905,975 | A | | 5/1999 | Ausubel ......................... 705/37 |
| 5,924,082 | A | | 7/1999 | Silverman et al. ............. 705/37 |
| 5,937,048 | A | * | 8/1999 | Pelle ....................... 379/201.12 |
| 5,956,687 | A | | 9/1999 | Wamsley et al. ................ 705/1 |
| 5,970,472 | A | | 10/1999 | Allsop et al. .................... 705/26 |
| 5,983,205 | A | | 11/1999 | Brams et al. ................... 705/37 |
| 6,052,674 | A | | 4/2000 | Zervides et al. ............... 705/40 |
| 6,064,981 | A | | 5/2000 | Barni et al. .................... 705/26 |
| 6,078,898 | A | | 6/2000 | Davis et al. .................... 705/19 |
| 6,112,181 | A | | 8/2000 | Shear et al. ...................... 705/1 |
| 6,112,189 | A | | 8/2000 | Rickard et al. ............. 705/36 R |
| 6,131,087 | A | | 10/2000 | Luke et al. ...................... 705/26 |
| 6,141,653 | A | | 10/2000 | Conklin et al. ................ 705/80 |
| 6,208,973 | B1 | | 3/2001 | Boyer et al. ...................... 705/2 |
| 6,243,691 | B1 | | 6/2001 | Fisher et al. .................... 705/37 |
| 6,285,987 | B1 | | 9/2001 | Roth et al. ...................... 705/27 |
| 6,330,551 | B1 | | 12/2001 | Burchetta et al. .............. 705/80 |
| 6,343,271 | B1 | | 1/2002 | Peterson et al. .................. 705/4 |
| 6,366,925 | B1 | | 4/2002 | Meltzer et al. .................... 705/1 |
| 6,401,080 | B1 | | 6/2002 | Bigus et al. ..................... 705/37 |
| 6,598,027 | B1 | | 7/2003 | Breen et al. |
| 6,847,935 | B1 | | 1/2005 | Solomon et al. ............... 705/14 |
| 6,954,741 | B1 | | 10/2005 | Burchetta et al. .............. 705/80 |
| 7,249,114 | B2 | | 7/2007 | Burchetta et al. .............. 705/80 |
| 7,831,523 | B2 | * | 11/2010 | Burchetta et al. .............. 705/80 |
| 7,840,440 | B2 | * | 11/2010 | Burchetta et al. .............. 705/35 |
| 2001/0039527 | A1 | | 11/2001 | Ordish et al. ................... 705/37 |
| 2002/0007362 | A1 | | 1/2002 | Collins et al. .................... 707/5 |
| 2002/0091532 | A1 | | 7/2002 | Viets et al. ....................... 705/1 |
| 2004/0073498 | A1 | | 4/2004 | Breen et al. |
| 2004/0210540 | A1 | | 10/2004 | Israel et al. ..................... 705/80 |
| 2005/0203785 | A1 | | 9/2005 | Kixmiller ......................... 705/7 |
| 2006/0080186 | A1 | | 4/2006 | Burchetta et al. .............. 705/26 |
| 2007/0106621 | A1 | | 5/2007 | Burchetta et al. .............. 705/80 |
| 2007/0150377 | A1 | | 6/2007 | Burchetta et al. .............. 705/27 |
| 2008/0065557 | A1 | | 3/2008 | Burchetta et al. .............. 705/80 |
| 2008/0065558 | A1 | | 3/2008 | Burchetta et al. .............. 705/80 |
| 2008/0126266 | A1 | | 5/2008 | Burchetta et al. .............. 705/80 |
| 2008/0140582 | A1 | | 6/2008 | Burchetta et al. .............. 705/80 |

FOREIGN PATENT DOCUMENTS

| | | |
|---|---|---|
| JP | 2002-366788 | 12/2002 |
| WO | WO 97/04410 A1 | 2/1997 |
| WO | WO 97/15362 A1 | 5/1997 |
| WO | WO 00/68865 | 11/2000 |

OTHER PUBLICATIONS

Dell'Omo, G.G., "Wage Disputes in Interest Arbitration: Arbitrators Weigh the Criteria" (Abstract only), Arbitration Journal, vol. 44, No. 2, pp. 4-13, Jun. 1989.*

Kleiman, M., "Financial Success," HP Professional, vol. 5, No. 8, p. 28, Aug. 1981.*

Zack, J.G., "Resolution of Disputes; The Next Generation," Transactions of AACE International, pp. 50-54, 1997.*

Ozdamar, L., et al., "A Flexible Heuristic for a Multi-Mode Capital Constrained Project Scheduling Problem with Probabilistic Cash Inflows" (Abstract), Computers and & Operations Research, vol. 24, No. 12, pp. 1187-1200, Dec. 1997.*

Merriam-Webster's Collegiate Dictionary, tenth edition, p. 1228, 1997.*

Anon., "Treasure Island—Wikipedia, the free encyclopedia," http://en.wikipedia.org/wiki/Treasure_Island, Apr. 1, 2010.*

Pryor, E.S., "After the Judgment," Virginia Law Review, vol. 88, No. 8, pp. 1757-1830, Dec. 2002.

Fritsche, Hans "Transaction exposure management in international construction " 1994 American Association of Cost Engineers Transactions 1994 Transactions pp. INT8.1-INT8.8.

O Kelly, Eugene D "A checkup for your treasury policy " Sep./Oct. 1995 Financial Executive v11n5 pp. 40-44.

U.S. Appl. No. 10/683,821, Burchetta et al.
U.S. Appl. No. 11/224,155, Burchetta et al.
U.S. Appl. No. 11/981,469, Burchetta et al., (Instant application).
U.S. Appl. No. 11/549,443, Burchetta et al.
U.S. Appl. No. 11/981,246, Burchetta et al.
U.S. Appl. No. 11/981,268, Burchetta et al.
U.S. Appl. No. 11/981,272, Burchetta et al.
U.S. Appl. No. 11/981,368, Burchetta et al.
U.S. Appl. No. 11/981,456, Burchetta et al.
U.S. Appl. No. 11/549,437, Burchetta et al.
U.S. Appl. No. 11/549,437, Amendment & Petition Oct. 14, 2009.
U.S. Appl. No. 11/549,437, Terminal Disclaimer Oct. 14, 2009.
U.S. Appl. No. 11/549,437, Amendment & Req for Rec Jan. 21, 2010.
U.S. Appl. No. 11/549,437, Final Rejection Apr. 6, 2010.
U.S. Appl. No. 11/549,417, Non-Final Office Action Feb. 23, 2009.
U.S. Appl. No. 11/549,417, Amendment & Req for Rec Oct. 14, 2009.
U.S. Appl. No. 11/549,417, Burchetta et al.
U.S. Appl. No. 11/284,155, Resp to Elect/Restrict Jan. 17, 2008.
U.S. Appl. No. 11/284,155, Non-Final Reject Apr. 3, 2008.
U.S. Appl. No. 11/284,155, Amend/Req for Recon Jul. 17, 2008.
U.S. Appl. No. 11/284,155, Non-Final Reject Nov. 3, 2008.
U.S. Appl. No. 11/284,155, Amend/Req for Recon Jan. 21, 2009.
U.S. Appl. No. 11/284,155, Notice of Allowance Apr. 24, 2009.
U.S. Appl. No. 10/683,821, Non-Final Rejection Sep. 8, 2005.
U.S. Appl. No. 10/683,821, Amend/Req for Recon Dec. 9, 2005.
U.S. Appl. No. 10/683,821, Final Rejection Jun. 15, 2006.
U.S. Appl. No. 10/683,821, Amend & RCE Oct. 16, 2006.
U.S. Appl. No. 10/683,821, Non-Final Reject May 18, 2007.
U.S. Appl. No. 10/683,821, Amend/Req for Recon Aug. 7, 2007.
U.S. Appl. No. 10/683,821, Non Responsive Amend Aug. 20, 2007.
U.S. Appl. No. 10/683,821, Amend/Req for Recon Sep. 13, 2007.
U.S. Appl. No. 10/683,821, Amend/Req for Recon Nov. 26, 2007.
U.S. Appl. No. 10/683,821, Sup Resp & Petition Dec. 13, 2007.
U.S. Appl. No. 10/683,821, Petition Decision Apr. 4, 2008.
U.S. Appl. No. 10/683,821, Sup Resp/Amend May 2, 2008.
U.S. Appl. No. 10/683,821, Final Rejection Jun. 9, 2009.
U.S. Appl. No. 10/683,821, Examiners Interview Dec. 8, 2009.
U.S. Appl. No. 10/683,821, Notice of Allowance Jan. 25, 2010.
U.S. Appl. No. 10/683,821, RCE & IDS Apr. 1, 2010.

Disposition: Vacated and Remanded; by Panel, Jul. 24, 2007.

Complaint against National Arbitration Forum, Inc. (Filing fee $150 receipt No. 326323.), filed by Cybersettle, Inc. (cw,) (Entered: Sep. 29, 2004).

Answer to Complaint, Seperate Defenses, Counterclaim against Cybersettle, Inc. by National Arbitration Forum, Inc. (Confoy, Karen) (Entered: Jan. 12, 2005).

Claim Plaintiff's Reply to Defendant's Counterclaims by Cybersettle, Inc., Cybersettle, Inc. (Lattimore, Jason) (Entered: Jan. 26, 2005).

Plaintiffs Answer to Counterclaim of Defendent by Cybersettle, Inc., (Lattimore, Jason) (Entered: Jan. 27, 2005).

Motion for Leave to File a First Amended Complaint by Cybersettle, Inc., Cybersettle, Inc. (Attachments: Exhibits #1-#15 to Declaration (Weider, Douglas) (Entered: Oct. 27, 2005).

Response in Opposition re 16 Motion for Leave to File a First Amended Complaint filed by National Arbitration Forum, Inc., National Arbitration Forum, Inc., (Attachments: 190 1 Declaration of Christopher E. Torkelson) (Torkelson, Christopher) (Entered: Nov. 7, 2005).

Reply to Response to Motion re 16 Motion for Leave to File a First Amended Complaint filed by Cybersettle, Inc. (Weider, Douglas (Entered: Nov. 18, 2005).

Motion to Strike National Arbitration Forum Inc.'s Defenses and Counterclaim that the '551 Patent is Obvious . . . (Weider, Douglas) (Entered: Dec. 7, 2005).

Declaration of Brian M. McGuire re 25 Motion to Strike . . . (Weider, Douglas) (Entered: Dec. 7, 2005).

Amended Complaint (First) against National Arbitration Forum, Inc., National Arbitration Forum, Inc . . . (Weider, Douglas) (Entered: Dec. 16, 2005).

Response in Opposition re 25 Motion to Strike . . . (Torkelson, Christopher) (Entered: Jan. 10, 2006).

Brief (Reply) in Further Support of Its Motion to Strike . . . (Weider, Douglas) (Entered: Jan. 12, 2006).

Answer to Amended Complaint Separate Defenses . . . (Confoy, Karen) (Entered: Jan. 13, 2006).

Order dismissing as 25 Motion to Strike & for partial summary judgment . . . Signed by Judge John J. Hughes on Jan. 17, 2006. (ck) (Entered: Jan. 23, 2006).

Plaintiff's Reply/ Answer to Counterclaim . . . (Weider, Douglas) (Entered: Jan. 24, 2006).

Stipulation by National Arbitration Forum, Inc . . . (Confoy, Karen) (Entered: Feb. 6, 2006).

Stipulation and Order of Dismissal . . . (Confoy, Karen) (Entered: Feb. 6, 2006).

Stipulation and Order dismissing w/ prejudice . . . Signed by Judge Mary L. Cooper on Feb. 8, 2006 (ck) (Entered: Feb. 8, 2006).

Motion for Summary Judgment of Infringement by Cybersettle, Inc . . . ((Weider, Douglas) (Entered: Mar. 24, 2006).

Motion for Summary Judgment Memorandum in Support of . . . (Weider, Douglas) (Entered: Mar. 24, 2006).

Declaration of Daniel A. Ladow re 46 Motion for Summary Judgment . . . (Weider, Douglas) (Entered: Mar. 24, 2006).

Brief in Support re 46 Motion for Summary Judgment of Infringement filed by Cybersettle, Inc.. (Weider, Douglas) (Entered: Mar. 30, 2006).

Reply to Response to Motion re 46 Motion . . . (Weider, Douglas) (Entered: Apr. 21, 2006).

Statement of Material Facts in Opposition re 56 Cross Motion for Summary Judgment . . . (Weider, Douglas) (Entered: Apr. 21, 2006).

Brief in Support re 56 Cross Motion for Summary Judgment . . . (Confoy, Karen) (Entered: Apr. 28, 2006).

Amended Document by National Arbitration Forum, Inc . . . (Confoy, Karen) (Entered: Apr. 28, 2006).

Memorandum Opinion re 46 Motion for Summary Judgment . . . Signed by Judge Mary L. Cooper on Nov. 9, 2006. (ck) (Entered: Nov. 9, 2006).

U.S. District Court, Dist. of NJ [Live] (Trenton) Civil Docket for Case #: 3:04-cv-04744-MLC-JJH; filed Sep. 24, 2004.

U.S. Appl. No. 11/981,268, Burchetta et al.

U.S. Appl. No. 11/981,456, Burchetta el al.

U.S. Appl. No. 11/614,775, Burchetta et al.

U.S. Appl. No. 11/981,469, Burchetta et al.

U.S. Appl. No. 11/614,775, filed May 11, 2009, Burchetta et al., Non-Final Office Action.

U.S. Appl. No. 11/614,775, filed Sep. 11, 2009, Burchetta et al., Amendment.

U.S. Appl. No. 11/614,775, filed Sep. 15, 2009, Burchetta et al., Interview Summary re Sep. 10, 2009.

U.S. Appl. No. 11/614,775, filed Nov. 2, 2009, Burchetta et al., Interview Summary re Oct. 27, 2009.

U.S. Appl. No. 11/614,775, filed Dec. 3, 2009, Burchetta et al., Prelim. Amd from U.S. Appl. No. 11/981,268.

U.S. Appl. No. 11/614,775, filed Dec. 14, 2009, Burchetta et al., Notice of Allowance and Interview Summary re Dec. 3, 2009.

Anon., "Sybase Adds Web-based Technical Support to its Customer Service," Presswire, Mar. 29, 1996.

Zeng, D.-Z. et al., "Double-offer Arbitration," Mathematical Social Sciences, vol. 31, No. 3, pp. 147-170, Jun. 1996.

Abstract from New York Times editorial, Tuesday, Jan. 8, 1985.

Hines, Bernard L., "Arbitration Spells Relief. (insurance settlements)," Best's Review-Property-Casualty Insurance Edition, vol. 86, p. 47, Jan. 1986.

Jackson, William, "Mediation Proposed for Securities Disputes," Business First-Columbus, vol. 9, No. 31, p. 4, Apr. 5, 1993.

Skrzycki, Cindy, "The Regulators: An Electric Negotiation—Modern Times: OSHA to Try Writing Rules in Cyberspace," The Washington Post, Financial Section, p. D1, Feb. 8, 1994.

Stephenson, Max, "Rescuing ADR from its Advances", Public Administration Review, vol. 55, No. 4, pp. 385-388, Jul./Aug. 1995.

Grob, K., and Schecter, P.L., "Discovering Opportunities in Alternative Dispute Resolution: A Step-by-Step Guide for Getting Involved," Outlook, vol. 62, No. 4, p. 18, Winter 1995.

Anon., "Online Courtroom Service Introduced for U.S. Disputes," Internet Business News, Jul. 1, 1996.

Robbins, Stuart, "Lowering the Cost of Doing Business through ADR," Distribution, vol. 96, No. 11, pp. 58-59, Oct. 1997.

Mandell, Janette, "Cyberspace Conflicts," Software Magazine, vol. 18, No. 4, p. 20, Mar. 1998.

Negussie, Mel, "How to Select a Mediator," Defense Counsel Journal, vol. 65, No. 2, pp. 256-261, Apr. 1998.

Mullins, R., "Mediation, Arbitration Venues Offer Corporate Litigants Justice-in-Time," Business Journal-Milwaukee, vol. 9, No. 39, p. S6, Jul. 4, 1992.

Schweber, Claudine, "Your Telephone May Be a Party Line: Mediation by Telephone," Mediation Quarterly, vol. 7, No. 2, pp. 191-195, Winter 1989.

Schneider Denenberg, Tia, "The Electronic Arbitrator," The Arbitration Journal, vol. 45, No. 1, pp. 48-52, Mar. 1990.

Arnold et al., "Patent Alternative Dispute Resolution Handbook," 1991.

Brams, Steven J. and Merrill III, Samuel, "Arbitration Procedures with the Possibility of Compromise," Control and Cybernetics, vol. 21, No. 1, pp. 131-149, 1991.

Thiessen, Ernest and Loucks, Daniel, "Computer Assisted Negotiation of Multi-Objective Water Resources Conflicts," Water Resources Bulletin, American Water Resources Association, vol. 28, No. 1, pp. 163-177, Feb. 1992.

Hill, Richard, "Will Cyberspace Use Cybercourts?," International Commercial Litigation, Issue 23, pp. 33-35, Oct. 1997.

Neal Yeend, Nancy, "Electronic Alternative Dispute Resolution System Design," Mediation Quarterly, vol. 11, No. 2, pp. 193-194, Winter 1993.

Shaw, et al., "Using Alternative Dispute Resolution in The Federal Government," 1993.

Macduff, Ian, "Flames on the Wires: Mediating from an Electronic Cottage," Negotiation Journal, vol. 10, No. 1, pp. 5-15, Jan. 1994.

Helie, John, "Conflict and Conflict Resolution on Electronic Networks", pp. 1-6, Jun. 1994.

SchWeber, Claudine, "The Use of Technology in Conflict Resolution," paper presented at the European Conference on Peacemaking and Conflict Resolution, Oct. 1994, San Sebastian, Spain.

Brams, Steven and Taylor, Alan, "Fair Division: From Cake-cutting to Dispute Resolution," published by Clark Boardman Callaghan, 1996.

Levin, Amanda, "Online Claim Settlement Services Hit the Net," The National Underwriter Company National Underwriter, Claims Services Review Section, Nov. 9, 1998.

The International Dictionary of Applied Mathematics, Van Nostrand, Princeton, 1960, p. 593.

Zeng, D.-Z. et al., "Intrinsic Gap and Final-Double-Offer Arbitration," in IFAC Large Scale Systems (conference proceedings), 1992.

Online Ombuds Office Web site, http://aaron.sbs.umass.edu/center/ombuds/default.htm and description.html, Apr. 14, 2000.

Colen, F.H., "Proactive Patent Protection," High Technology Business, vol. 9, No. 8, p. 14, Sep.-Oct. 1989.

Low, "Mediation vs. Litigation: How You Can Cut Costs," Texas Banking, vol. 80, No. 5, pp. 8-9, May 1991.

Anon., "Title IV—Judicial Reforms," Health Legislation and Regulation, vol. 20, No. 3, Jan. 19, 1994.

Anon., "Pru Settlement Stalls State ADR Plan," Insurance Regulator, vol. 8, No. 37, p. 1, Sep. 30, 1996.

Anon., "Pharmacists' Antitrust Class-Action Lawsuit Opens," Marketletter, Oct. 5, 1998.

Ferling, R. L., et al. "New Plans, New Policies," Best's Review—Life-Health Insurance Edition, vol. 92, No. 8, p. 85, Dec. 1991.

Lewthwaite, G.A., "Paying for Years of Pain," Baltimore Morning Sun, Final Edition, p. 2A, Apr. 22, 1997.

Attrino, "P-C Agents Issue Checkbook Claims," National Underwriter, vol. 102, No. 29, pp. 15, 18, Jul. 20, 1998.

Anon., "Consultation on Periodical Payments for Future Loss," M2 Presswire, Mar. 13, 2002.

Brandenburger, A. and Nalebuff, B., Web pages from Co-opetition Interactive, Settlement Escrows, A Negotiation Tool, www.mayet.som.yale.edu/coopetition, and corresponding pages from the Internet Archiveat http://www.archive.org/, May 4, 1997.

Anon., "13 Alternatives to High Cost Litig. 147," Westlaw, Nov. 1995; 1995 CPR Institute for Dispute Resolution f/k/a Center for Public Resources/CPR Legal Program.

Dauer, et al., "Manual of Dispute Resolution, ADR Law and Practice," vol. 1, Ch. 1-13, Shepard's/McGraw-Hill, Inc. May 1994.

Grenig, Jay E., "West's® Legal Forms, vol. 26, Alternative Dispute Resolution," St. Paul, Minn. West Publishing Co. 1995.

Grenig, Jay E., "Alternative Dispute Resolution With Forms," 2d Ed., St. Paul, Minn. West Publishing Co. 1997.

Anon., "Sybase Adds Web-based Technical Support to its Costumer Service," Presswire, Mar. 29, 1996.

Zeng, D. Z. et al., "Double-offer Arbitration," Mathematical Social Sciences, vol. 31, No. 3, pp. 147-170, Jun. 1996.

Hines, Bernard L., "Arbitration Spells Relief. (insurance settlements)," Best's Review—Propert-Casualty Insurance Edition, vol. 86, p. 47, Jan. 1986.

Jackon, William, "Mediation Proposed for Securities Disputes," Business First-Columbus, vol. 9, No. 31, p. 4, Apr. 5, 1993.

Skrzycki, Cindy, "The Regulators: An Electric Negotiation—Modern Times: OSHA to Try Writing Rules in Cyberspace," The Washington Post, Financial Section, p. D1, Feb. 8, '94.

Stephenson, Max, "Rescuing ADR from its Advances," Public Administration Review, vol. 55, No. 4, pp. 385-388, Jul./Aug. 1995.

Grob, K., et al., "Discovering Opportunities in Alternatives Dispute Resolution: A Step-by-Step Guide for Getting Involved," Outlook, vol. 62, No. 4, p. 18, Winter 1995.

Mullins, R. "Mediation, Arbitration Venues Offer Corporate Litigants Justice-in-Time," Business Journal-Milwaukee, vol. 9, No. 39, p. S6, Jul. 4, 1992.

Schneider Denenberg, Tia, "The Electronic Arbitrator," The Arbitrator Journal, vol. 45, No. 1, pp. 48-52, Mar. 1990.

Arnold et al.; "Patent Alternative Dispute Resolution Handbook," 1991.

Thiessen, E. et al, "Computer Assisted Negotiation of Multi-Objective Water Resources Conflicts," Water Resources Bulletin, American Water Resources Asso. vol. 28, No. 1, 1992.

Hill, Richard, "Will Cyberspace Use Cybercourts?" International Commercial Litigation, Issue 23, pp. 33-35, Oct. 1997.

Shaw et al., "Using Alternative Dispute Resolution in the Federal Government," 1993.

Helie, John, "Conflict and Conflict Resolution on Electronic Networks," pp. 1-6, Jun. 1994.

Schweber, C.,"The Use of Technology in Conflict Resolution," paper presented at the European Conference on Peacemaking and Conflict Resolution, Oct. 1994, San Sebastian, Spain.

Levin, Amanda, "Online Claim Settlement Seervices Hit the Net," The National Underwriter Company National Underwriter, Claims Services Review Section, Nov. 9, 1998.

Zeng, D. Z. et al, "Intrinsic Gap and Final-Double-Offer Arbitration," in IFAC Large Scale Systems (conference procedings), 1992.

Online Ombuds Office Website, http://aaron.sbs.umass.edu/center/ombuds/default.htm and description.html, Apr. 14, 2000.

Colen, F. H., "Proactice Patent Protection," High Technology Business, vol. 9, No. 8, p. 14, Sep.-Oct. 1989.

Anon., "Title IV-Judicial Reforms:" Health Legislation and Regulation, vol. 20, No. 3, Jan. 19, 1994.

Anon., "Pru Settlement Stalls State ADR Plan," Insurance Regulator, vol. 8, No. 37 p. 1, Sep. 30, 1996.

Ferling, R.L. et al., "New Plans, New Policies," Best Review-Life-Health Insurance Edition, vol. 92, No. 8, p. 85, Dec. 1991.

Attrino, "P-C Agents Issue Checkbook Claims," National Underwritier, vol. 102, No. 29, pp. 15, 18, Jul. 20, 1998.

Anon., 13 Alternatives to High Cost Litig. 147, Westlaw, Nov. 1995; 1995 CPR Institute for Dispute Resolution f/k/a Center for Public Resources/CPR Legal Program.

Dauer et al., "Manual of Dispute Resolution, ADR Law and Practice," vol. 1, Ch. 1-13, Shpeard's/McGraw Hill, Inc. May 1994.

Grenig, Jay E., "West's Legal Forms, vol. 26, Alternative Dispute Resolution," St. Paul, Minn. West Publishing Co. 1995.

Grenig Jay E., "Alternative Dispute Resolution with Forms," 2d Ed., St. Paul, Minn. West Publishing Co. 1997.

Appellent Principal Brief, Feb. 16, 2007.

Appellee or Cross Appellent Principal Brief Filing Date, Mar. 28, 2007.

Appellent Reply Brief Filing Date, Apr. 16, 2007.

*Apollo Enterprise Solutions* v. *Debt Resolve*; Case No. 8:2007cv00106; Filed Jan. 29, 2007; (C.D.Ca.) Complaint (from Exhibit A of Complaint in Dist. N.J. case, before).

*Debt Resolve, Inc.* v. *Apollo Enterprise Solutions, LLC*; Case No. 3:2007cv00103; Filed Jan. 8, 2007; .(Dist. N.J.). Complaint.

*Debt Resolve, Inc.* v. *Apollo Enterprise Solutions, L.L.C.*; Case No. 1:2007cv04531; Filed May 30, 2007; (SDNY). Answer and Counterclaim; Memo of Law in Support of Defendant's Motion for Summary Judgment of Patent Non-Infringement Including Statement of Facts and Exhibit 5 Deposition Transcript of C. Imrey, Ceo of Appollo Enterprise Soluticn LLC; Debt Resolve's Opposition to Appollo's Motion for Summary Judgment; Dismissal.

* cited by examiner

COMPUTERIZED TRANSACTION BARGAINING SYSTEM AND METHOD

CROSS REFERENCE TO RELATED APPLICATIONS

This application is a continuation of application Ser. No. 11/549,437 U.S. Pat. No. 7,831,523 filed Oct. 13, 2006, which is a divisional of application Ser. No. 10/683,821, now U.S. Pat. No. 7,840,440 filed Oct. 10, 2003, which is a continuation-in-part of application Ser. No. 10/683,819, filed Oct. 10, 2003 now U.S. Pat. No. 7,249,114, which is a continuation-in-part of application Ser. No. 09/370,394 filed Aug. 6, 1999 now U.S. Pat. No. 6,954,741, which is a continuation-in-part of application Ser. No. 09/130,154, now U.S. Pat. No. 6,330,551, filed Aug. 6, 1998, each of which are incorporated herein by reference.

This invention relates generally to bargaining and more particularly to on-line automated bargaining among opposite parties in a confidential environment.

BACKGROUND OF THE INVENTION

For those not savvy in sales tactics and persuasion, bargaining is, to many, at best a hassle. The bargaining process discourages many potential buyers and sellers from engaging in transactions that require "haggling". Evidence of this is the proliferation of advertisements for "no-hassle pricing" in industries which traditionally use the bargaining process, such as automobile sales.

Even for those who are not adverse to bargaining, there is no system or method for engaging in a bargained transaction in an automated environment. In on-line systems, there are "reverse auctions", such as the process established by Priceline®, and there are many online auctions such as E-bay®. There are, however, no systems devoted to the process of multi-round automated bargaining to efficiently reach the best price in a given transaction. As such, parties to a transaction do not get the best price or a transaction fails because no price is acceptable to one or both of the parties in the transaction.

What is needed is a system that allows parties to engage in bargaining for the best price in a given transaction and without the impediments of party discomfort. The present invention is based on the premise that a bargained transaction allows parties on opposite sides of a transaction to reach a price most acceptable to both. Additionally, those who are adverse to "haggling for price" need a system to engage in a bargained transaction without the discomfort traditionally associated with such bargaining. The invention is also based on the understanding that many more market transactions would be consummated if there were a system which opposed parties to find a price acceptable to both.

SUMMARY OF THE INVENTION

In general, in a first aspect, the invention features a transaction bargaining method. The method involves testing pairs of non-equal values, submitted by two opposite parties for a transaction, for satisfaction of a condition. If the condition is not satisfied, the method further involves testing a pair of non-equal power round values, one from each of the two opposite parties for the transaction, for satisfaction of a power round condition. The method further involves calculating a binding bargained payment, when the condition is satisfied by a pair of the non-equal values. The binding bargained payment is an amount at least equal to a lower of the pair of the non-equal values.

In general, in a second aspect, the invention features a transaction bargaining method. The method involves receiving values, submitted by two opposite parties for a transaction. At least one of the values is submitted following a communication of a facilitating message regarding the transaction, conveyed from a facilitator to at least one of the two opposite parties. The method further involves testing the pairs of non-equal values for satisfaction of a condition, and calculating a binding bargained payment, when the condition is satisfied by a pair of the non-equal values. The binding bargained payment is an amount at least equal to a lower of the pair of the non-equal values.

In general, in a third aspect, the invention features a bargaining method for resolving a transaction between two opposite parties. The method involves testing pairs of non-equal values, submitted by the two opposite parties for the transaction, for satisfaction of a condition. The method further involves calculating a binding bargained payment, when the condition is satisfied by a pair of the non-equal values. The binding bargained payment incorporates a windfall adjustment, when one of the parties is a transaction entry initiator for the transaction, in an amount at least equal to a lower of the pair of the non-equal values adjusted by either a positive or negative windfall differential amount.

In general, in a fourth aspect, the invention features a bargaining method for resolving a transaction between two opposite parties. The method involves testing pairs of non-equal values, submitted by the two opposite parties for the transaction, for satisfaction of a condition. The method further involves calculating a binding bargained payment, when the condition is satisfied by a pair of the non-equal values, of an amount at least equal to a lower of the pair of the non-equal values, and initiating an on-line transfer of funds between the parties for the amount.

In general, in a fifth aspect, the invention features a bargaining method for resolving a transaction between two opposite parties. The method involves testing pairs of non-equal values, submitted by the two opposite parties for the transaction, for satisfaction of a condition. The method further involves calculating a binding bargained payment, when the condition is satisfied by a pair of the non-equal values, of an amount at least equal to a lower of the pair of the non-equal values. The method further involves automatically, when the condition is satisfied, generating a agreement document for the transaction.

In general, in a sixth aspect, the invention features systems which operate according to the disclosed techniques via an on-line interface.

Particular embodiments of the invention may feature one or more of the following advantages: lower cost for each party from initiation through bargaining; an increased probability of agreement for some transactions; encouragement that the transaction may reach agreement; some indication that an agreement may actually be reached; higher customer satisfaction with the transaction bargaining; attraction of a higher number of transactions to the system; lower cost to initiators relative to hiring an agent to engage the system or file and bargain a transaction; lower costs to parties than retail transactions; more economically efficient transactions than those achieved in an auction or in a reverse auction; greater comfort for parties engaging the system because the legal knowledge necessary to draft a simple contract or agreement is not needed; lower cost because an agent or attorney is not needed or minimally needed to memorialize the agreement; consolidation and simplification of multiparty bargaining into effectively a two party bargaining; greater flexibility for parties since they control the particular method of payment; faster receipt of proceeds from bargained agreements; or smaller likelihood of post agreement defaults by buyers or sellers, and real-time, instantaneous bargaining.

Particular embodiments of systems incorporating the invention may feature one or more of the following additional advantages: the ability for individuals to directly contact and engage in a bargained transaction; the ability to receive an immediate or direct crediting, transfer or initiation of a transfer of the value arrived at through the bargaining process; or the ability to receive a windfall adjustment if a bargaining results in an agreement by being an initiator.

The above advantages and features are of representative embodiments only, and are presented only to assist in understanding the invention. It should be understood that they are not to be considered limitations on the invention as defined by the transactions, or limitations on equivalents to the claims. For instance, some pairs of these advantages are mutually contradictory, in that they cannot be simultaneously present in a single embodiment. Similarly, some advantages are applicable to one aspect of the invention, and inapplicable to others. Thus, this summary of features and advantages should not be considered dispositive in determining equivalence. Additional features and advantages of the invention will become apparent in the description, from the drawings, and from the claims.

It is an object of this invention to provide computer executable method for bargaining, operative to control a computer and stored on at least one computer readable medium. The method when executed comprises: a) receiving a plurality of offers from a first party for a transaction; b) receiving a plurality of counter-offers from a second party for the transaction; c) preventing disclosure of the offers to the second party, and preventing disclosure of the counter-offers to the first party; d) calculating differences between the offers and the counter-offers in rounds, each of the differences being calculated in a round using one offer and one counter-offer, the one offer and the one counter-offer being unequal in value; e) determining whether any of the differences fall within at least one predetermined criterion; f) if any of the differences fall within the at least one predetermined criterion, transmitting a message to the first party and the second party that the transaction is resolved; and g) if the differences do not fall within the at least one predetermined criterion, transmitting a message that the transaction has not been resolved. Further provided is the method wherein the one offer is received before the one counter-offer. Still further provided is the method wherein the one offer is received after the one counter-offer. The method further comprises limiting the plurality of counter-offers which may be received to a maximum of three. Also included in the method is allowing one of the parties to specify a maximum number of rounds. Further provided is the method wherein d), e), f) and g) are performed after receiving less than a maximum specified number of the plurality of offers. Finally, the method wherein all counter-offers are received before any of the offers are received is also provided.

Another object of the invention is to provide an automated method of bargaining between at least two parties using monetary offers and counter-offers, comprising: receiving an engagement request from a first party to engage an automated bargaining system, for a transaction, and to be bound by a resolution of the transaction transmitted from the automated bargaining system; and receiving an engagement indication from a second party to engage the automated bargaining system for the transaction.

The method provides receiving a series of at least three monetary offers from the first party; receiving a series of at least three counter-offers from the second party; maintaining inaccessibility of the monetary offers from the second party; and maintaining inaccessibility of the settlements offers from the first party. The method progresses to comparing a first offer of the series of monetary offers with a first counter-offer in a first round to determine if a first difference between the first monetary offer and the first counter-offer is within a predetermined guideline. If, in the first round, the first difference is within the predetermined guideline, transmitting a successful agreement notification to the first party and the second party; if, in the first round, the first difference is not within the predetermined guideline, the method progresses to comparing a second offer of the series of monetary offers with a second counter-offer in a second round to determine if a second difference between the second monetary offer and the second counter-offer is within the predetermined guideline. If, in the second round, the second difference is within the predetermined guideline, transmitting a successful agreement notification to the first party and the second party.

If, in the second round, the second difference is not within the predetermined guideline, the method progresses to comparing a third offer of the series monetary offers with a third counter-offer in a third round to determine if a third difference between the third monetary offer and the third counter-offer is within the predetermined guideline and if, in the third round, the third difference is within the predetermined guideline, transmitting a successful agreement notification to the first party and the second party.

If, in all of the first, second and third rounds, the first, second and third differences are not within the predetermined guideline, the method includes transmitting an unsuccessful agreement signal to said first party and said second party. If in any round, the successful agreement notification is transmitted, the method further comprises generating a bargained value notification includes a bargained agreement amount to be paid to the first party by the second party.

The method also further comprises calculating the bargained agreement amount using at least the monetary offer from the round in which the successful agreement notification is transmitted. Further provided is the method wherein the calculating also uses the counter-offer. If, in any of the first, second or third rounds, the successful agreement notification is transmitted, the method further comprises calculating a payment value for the transaction from a pair of values used in the round for which the successful agreement notification is transmitted; and storing the payment value in an engaging party accessible database. If in the first round the first difference is not within the predetermined guideline, the method further comprises rendering the first monetary offer and the first counter-offer unavailable to the automated bargaining system for the second round. If in the second round the second difference is not within the predetermined guideline, the method further comprises: rendering the second monetary offer and the second counter-offer unavailable to the automated bargaining system for the third round. Further provided is the method wherein, if in the third round the third difference is not within the predetermined guideline, the method further comprises rendering the third monetary offer and the third counter-offer unavailable to the automated bargaining system.

Also included is the method wherein the bargained agreement amount is a median of one offer and one counter-offer, or, the bargained agreement amount is equal to an amount specified by one offer. Further provided is the method of wherein the predetermined guideline is that a single counter-offer and a single offer differ from each other by less than a fixed amount. Also included is the method wherein the fixed amount is a calculated amount representing a percentage of one of the single counter-offer or the single offer. Further provided is the method wherein the specified condition is that a single counter-offer is within a predetermined percentage of a single offer. The predetermined percentage of the method may be 70% or 80%. Also provided is the method wherein one of the series of three monetary offers is received before one of the series of three counter-offers. Further provided is the method of wherein one of the series of three counter-offers is received before one of the series of three monetary offers.

Another object of the invention is to provide a bargaining method for resolving a transaction between two opposite parties in rounds, the method comprising: testing a pair of non-equal values in one of at least two rounds, one value in the pair submitted by one of the two opposite parties for the transaction; and calculating a binding bargained payment of an amount at least equal to a lower of the pair of the non-equal values, when an agreement determination algorithm used in the testing is satisfied by the pair of the non-equal values. The method further comprises limiting the bargained payment to the greater of the pair of non-equal values. The method still further comprises receiving at least a value of the pair of non-equal values on a weekend day. The method also comprises receiving at least a value of the pair of non-equal values at a time other than between 9 a.m. and 4 p.m. on a weekday. Finally, the method further comprises storing the amount correlated to case specific information in a database.

Another object of the invention is to provide a method of operating a bargaining system comprising: receiving a plurality of values from each of a first and second party to a dispute, at least one of the plurality of values having been received via an internet connection; matching, on a one for one basis, values from the first party and values from the second party to create a plurality of pairs without disclosing either the first party's values to the second party or the second party's values to the first party; analyzing pairs in accordance with a preset formula such that if, when analyzed, a pair meets at least one specified criterion, the system will report to the first and second parties that an agreement is reached. When at least one specified criterion is met, the method further comprises calculating a bargain value using at least a part of the pair. Also included is the method wherein the calculating comprises: determining a median value for the pair. The method further comprises allowing, the first party to make a selection of the preset formula. The method further comprises, prior to the receiving, requiring one of the first or second parties to make a selection of the preset formula; and requiring another of the first or second parties to agree to the selection. Also included in the method is receiving a sponsor identification number for the bargain and transaction description information for the bargain. The method also further includes: receiving information representing a geographical information for the bargain.

Another object of the invention is to provide a method comprising: registering a first entity in an automated bargaining system with respect to a bargain negotiation involving a transaction; following registration, receiving a transaction identifier and at least two monetary submissions from the first entity; associating at least one proposed bargained agreement amount submitted by a second entity with respect to the transaction with at least one of the at least two monetary submissions; processing a proposed bargained agreement amount and one of the at least two monetary submissions in accordance with a specified algorithm to obtain a result; and notifying the first entity that an agreement of the transaction has been reached and of a payment amount, when the result meets a criterion agreed to by the first entity, without ever informing the first entity of the at least one proposed bargained agreement amount. The method of further comprises: permanently discarding at least one proposed bargained agreement amount and the one of the at least two monetary submissions when the settlement has been reached. The method further comprises: storing transaction related information for the bargain negotiation and the payment amount in the automated bargaining system for tabulation.

Another object of the invention is to provide a bargaining method comprising receiving offers and counter-offers with respect to a transaction, each of the offers having been received via a password protected communication linkage and having an associated sequence number, and each of the offers having an associated sequence number; matching offers against counter-offers based upon a correspondence between the sequence numbers; testing matched offers and counter-offers against an algorithm; generating a result in response to a testing of an offer and a offer; and automatically reporting the result, without disclosing the offer or counter-offer. Further provided is the method wherein, when the result is no bargain, the method further comprises discarding the offer and the counter-offer. Further provided is the method wherein, when the result is an agreement, the method further comprises calculating a bargained agreement amount according to a preestablished formula; and reporting the bargained agreement amount. The method still further comprises obtaining an agreement from an entity to be paid to participate in an indirect bargain negotiation using an on-line bargaining system and, when the result indicates an agreement, to be legally bound to agree to the transaction for an amount specified by the on-line bargaining system. The method also further comprises obtaining an agreement from a sponsor to participate in an indirect bargain negotiation, generating an exposure amount using an offer submitted by the sponsor, and informing the sponsor of the exposure amount. The method further comprises generating a potential bargain gain amount using a offer; and informing the entity to be paid of the bargain gain amount.

Another object of the invention is to provide a method comprising agreeing to at least one criterion which, when applied by a bargaining system to values and satisfied, will result in an agreement of a transaction against a party for a payment amount specified by the bargaining system, the payment amount being derived from at least one of the values; submitting a plurality of monetary values to the bargaining system via a security protected on line interface, which will be analyzed by the bargaining system using the at least one criterion without revealing any of the monetary values to the party; receiving an indication that the at least one criterion is satisfied by an unrevealed value from the party and at least one of the plurality of monetary values; and receiving a notification of the payment amount for the transaction. Further provided is the method wherein, prior to receiving the indication, the method includes receiving a message that the at least one criterion has not been satisfied for one unrevealed value for the party and one monetary value. Further provided is the method wherein the payment amount is at least one of the plurality of monetary values. Further provided is the method wherein the payment amount is greater than at least one of the plurality of monetary values. The method still further includes logging in to the bargaining system through the internet. The method may also include providing transaction specific identification information. Providing agent contact information for the transaction is also included in the method. The method further includes tabulating the transaction specific information. The method further includes accessing the bargaining system using a web browser. Also included in the method is submitting a plurality of cases to the bargaining system, the transaction relating to one of the plurality of cases.

Another object of the invention is to provide a method comprising steps, stored in an automated bargaining system including a processor and storage, for bargaining, the method comprising a step of executing a first program module, written in a markup language, for receiving values submitted by a party via the internet, the values representing a series of proposed amounts for which a transaction would be bargained; a step of executing a program object, written in an object oriented programming language, for sequentially comparing individual proposed amounts of the series of proposed amounts against individual proposed counter amounts of a series of proposed counter amounts, all of the proposed counter amounts being unavailable to the party, in order to determine if a difference between and of the sequentially compared individual proposed amounts and counter amounts is within a specified range and for generating an agreement indication if the difference is within the specified range; and a step of executing a second program module for informing the party that the transaction is bargained by a payment of a calculated amount. The method further includes a step for calculating a bargained agreement amount according to a specified formula using an individual proposed amount as an input for the specified formula for specifying a payment to be made in bargaining the transaction. The method still further includes a step for calculating a bargained agreement amount according to a specified formula using an individual proposed counter amount as an input for the specified formula for specifying a payment to be made in bargaining the transaction. Also included in the method is a step for calculating a bargained agreement amount according to a specified formula using both an individual proposed amount and an individual proposed counter amount as an input for the specified formula for specifying a payment to be made in bargaining the transaction. The method still further includes a step for logging the party in. The method further includes a step for collecting and processing settlement data using the processor. Finally, the method further includes a step for checking administration authorization to enable an administrator to add a sponsor into the automated bargaining system.

Another object of the invention is to provide a method comprising: receiving a submission of a transaction from a sponsor; receiving an agreement to at least one criterion which, if satisfied, would result in a binding agreement; generating a message for communication to a representative of a the entity to be paid involved in the transaction which invites the representative to participate in an automated bargaining negotiation for the transaction; receiving a responsive agreement from the representative to participate and to be bound by the automated bargaining negotiation, if at least one criterion is satisfied by offers submitted by the representative and correlated counter-offers submitted by the sponsor; receiving at least two offers submitted by the representative and a counter-offer submitted by the sponsor, within a specified limited time period; comparing one of the offers and the counter-offer in a round of at least two rounds to determine if the at least one criterion is satisfied; and if the at least one criterion is satisfied, generating an indication that the transaction is bargained for a payment amount. The method further comprises: requiring entry of an identification number prior to receiving the offer and the counter-offer. The method further comprises storing the payment amount for future retrieval. The method still further comprises calculating the payment amount as a median of the one offer and the counter-offer. The method further comprises calculating the payment amount as a value between the offer and the counter-offer.

Another object of the invention is to provide a method comprising receiving first signals including data representing a series of monetary amounts for a transaction from a first entity; preparing the first signals for automated testing against an algorithm by a bargaining system in conjunction with information from a second entity, the second entity being opposite to the first entity with respect to the transaction; receiving a response signal indicating that a test of one of the series of monetary amounts caused an agreement condition in the bargaining system; forwarding a message including data representing a bargained agreement amount, in response to the agreement condition, for ultimate delivery to the first entity. The method further includes receiving second signals including the information from the second entity, the information having data representing at least one proposed bargained agreement amount for the transaction. Further provided is the method wherein the first entity is one of an entity to be paid, or a representative of the entity to be paid. The method further includes forwarding cookie data sent by the bargaining system for storage on a hard drive associated with either the first or second entity usable by the bargaining system to track usage by the first or second entity. Further included in the method is receiving third signals from the bargaining system for forwarding to a computer associated with either the first or the second entity which, when received, would cause the computer to retrieve the cookie data from the hard drive and send it to the bargaining system.

Another object of the invention is to provide a method of automated on-line bargaining comprising maintaining an interface to the internet through which an entity to be paid can submit offers for a transaction to a bargaining system and receive indications therefrom such that, when the entity to be paid submits multiple offers via the interface to the bargaining system and the bargaining system pairs the multiple offers with counter-offers of agreement for the transaction on a one-to-one basis, a comparison will be performed in accordance with at least one criterion and the entity to be paid will be provided with either a positive or negative indication, via the interface, as to whether or not the at least one criterion is satisfied for a pair. The method further comprises: forwarding received information, via the interface, for display to the entity to be paid including a bargain value supplied by the bargaining system calculated when the at least one criterion is satisfied. The method still further comprises hosting the bargaining system. Further comprised by the method is storing a processor executable program which, when executed, performs the comparison and provides the entity to be paid with the either positive or negative indication for the transaction.

Another object of the invention is to provide a system comprising: a first value, selected from at least two values submitted on line by a first entity; a second value submitted on line by a second entity, the first value being inaccessible to the second entity and the second value being inaccessible to the first entity, the first value and the second value being different in magnitude from each other; a proxy includes an input, an output and a computer executable program, the program being structured to, when executing, accept a pair of values from opposite entities via the input and return a result indicator to the proxy based upon a mathematical comparison of the pair of values in a round of at least two rounds, the program being further structured to provide a payment value to at least one of the opposite entities via the output when the result indicator indicates that at least one predetermined criterion is satisfied for one of the at least two rounds.

The system further includes a processor accessible storage configured to temporarily store the first and second values for retrieval by the proxy via the input. Further provided is the system wherein the computer executable program includes a plurality of modules, one of which is programmed in an object oriented programming language, such as JAVAScript, and another of which is programmed in a markup language such as ColdFusion Markup Language or Hyper Text Markup Language (HTML).

Further provided is the system wherein, when the program is executed and the result indicator indicates that the at least one predetermined criterion is not satisfied, the proxy discards the pair of values. Also provided is the system wherein, when the program is executed and the result indicator indicates that the at least one predetermined criterion is satisfied, the proxy calculates the payment value from the pair of values and then discards the pair of values. Further provided is the system wherein the first value is an offer made by a sponsor and the second value is a offer made by the entity to be paid. The system further includes an entity accessible detail log including a correlation of payment values and transaction specific information.

Also provided is the system wherein the transaction specific information includes data indicative of a geographic area. The system further includes proxy accessible storage into which the proxy can store the payment value and data representing transaction specific information when the result indicator indicates that the at least one predetermined criterion is satisfied.

Further provided is the system wherein the pair of values is the first and second values, the at least one predetermined criterion is satisfied and the payment value is the median of the first and second values. Still further provided is the system wherein the pair of values is the first and second values, the at least one predetermined criterion is satisfied and the payment value is the greater of the first and second values. The system wherein the at least one predetermined criterion is that the pair of values must be within a fixed percentage of each other is also provided. The system further includes a predetermined override amount which will be compared to a differential between the pair of values if the result indicator indicates that the at least one predetermined criterion is not satisfied and, if the differential is less than the predetermined override amount, will cause the proxy to provide the payment value for the transaction to at least one opposite entity even though the at least one predetermined criterion was not satisfied. Further provided is the system wherein the pair of values is the first and second values, the at least one predetermined criterion is satisfied and the payment value is the median of the first and second values. Further provided is the system wherein the pair of values is the first and second values, the at least one predetermined criterion is satisfied and the payment value is the greater of the first and second values. Still further provided is the system wherein the pair of values is the first and second values, the at least one predetermined criterion is satisfied and the payment value is a function of the first and second values. The system wherein the at least one predetermined criterion is a fixed spread value is also provided. Also provided is the system wherein the payment value is of a magnitude between one of the values in the pair of values and another of the values in the pair of values.

The system further includes a program execution limit which provides a limit on a number of times the proxy will accept the pair of values. Further provided is the system wherein, the predetermined action is a discarding of the at least one of the first or second values. The system wherein the first and second values are withdrawable and the predetermined action prevents a withdrawal of one of the first or second values is also provided.

The system further includes an entity accessible detail log including a correlation of payment values and transaction specific information. The entity accessible detail log can be written in a markup language. The system also can include an exposure calculator. The exposure calculator can be written in an object oriented programming language such as JAVAScript.

Still further provided is the system wherein the first value is one of a plurality of sequentially submitted first values and the second value is one of a plurality of sequentially submitted second values, all of the sequentially submitted values being inaccessible to the entity that did not submit them, and wherein the program is further structured to utilize another of the plurality of sequentially submitted first values, specified by the first entity, in place of the first value and another of the plurality of sequentially submitted second values, specified by the second entity, in place of the second value when the result indicator indicates that the at least one predetermined criterion is not satisfied for the first and second values. Also provided is the system wherein each of the plurality of first values is submitted by the first entity according to a specified order. The system further includes a program execution limit which provides a limit on a number of times—two or three, for example, that the proxy will accept the pair of values. 120.

The system still further includes a payment calculator which, when the at least one predetermined criterion has been satisfied, will calculate, in accordance with a formula, a monetary amount to be paid by one entity to the other to settle the transaction. Further provided is the system wherein the formula is a median of the pair of values which caused the at least one predetermined criterion to be satisfied. Further provided is the system wherein the formula is the greater of the pair of values which caused the at least one predetermined criterion to be satisfied.

The system further includes an entity searchable database includes data relating to bargained transactions. Further provided is the system wherein the data includes geographic information for each bargained transaction. Further provided is the system wherein the data includes a monetary amount for each bargained transaction. Further provided is the system wherein the system further includes a communication link over which the entity searchable database can be accessed by an entity prior to submitting an offer or a counter-offer. Also provided is the system wherein the first plurality of values are offers from an entity to be paid. Further provided is the system wherein the first value is one of a plurality of sequentially submitted first values and the second value is one of a plurality of sequentially submitted second values, all of the sequentially submitted values being inaccessible to the entity that did not submit them, and wherein an acceptance of a pair of values by the program along with the returning of the result indicator constitutes a round.

Another object of the invention is to provide a bargaining application stored on at least one computer accessible storage medium for execution by a processor comprising a plurality of modules which, when executed by the processor: accepts and compares paired monetary values submitted by two entities opposite to each other with respect to a transaction, discards the paired monetary values which differ from each other by more than a specified range, calculates a bargained agreement amount to be paid by one entity to another entity if a pair of the monetary values differ from each other within the specified range based upon the pair and then discards the pair, and provides the bargained agreement amount for delivery to the two entities.

Another object of the invention is to provide a method of automated bargaining in a system with at least one central processing unit comprising: (a) introducing into the central processing unit, information corresponding to a series of rounds of offers to satisfy a transaction received from a first party for a transaction without disclosure of the offers to any parties opposite to the first party in the dispute; (b) introducing into the central processing unit, information corresponding to a series of rounds of counter-offers to reach an agreement for the transaction received from a second party, opposite to the first party, for the transaction without disclosure of the offers to any parties opposite to the second party in the dispute; (c) steps (a) and (b) occurring in any order; (d) comparing the information corresponding to the series of offers and the series of counter-offers on a round-by-round basis in accordance with preestablished conditions; (e) determining, using the central processing unit, if an agreement of the transaction is caused by a offer and a counter-offer in a round by meeting the preestablished conditions; (f) if the offer and the counter-offer in the round cause the agreement, calculating a bargained payment equal to one of: (i) a first amount, calculated in accordance with a first preestablished formula, of the offer in the round is less than the counter-offer and within a preestablished percentage of the offer in the same round, or (ii) the offer, if the offer in the round is the same as or greater than the counter-offer, or (iii) a second amount, calculated in accordance with a second preestablished formula, if the offer is not within the preestablished percentage of the offer in all individual rounds but the difference between a particular counter-offer and a corresponding offer is less than a preestablished amount; (g) permanently deleting the series of offers and the series of counter-offers when either none of the series of offers and series of counter-offers meet the preestablished conditions of the bargained payment has been calculated; and (h) communicating either failure to agree message, when none of the series of counter-offers and series of offers meet the preestablished conditions and every difference between individual unsuccessful offers and corresponding counter-offers is greater that a preestablished amount, or an agreement message includes the bargained payment, when the preestablished conditions are met or the offer is not within the preestablished percentage of the counter-offer in all rounds but the difference between the particular offer and the corresponding counter-offer is less than the preestablished amount.

Another object of the invention is to provide a system for automated bargaining comprises: a processor for processing offers and counter-offers; means for introducing to the processor, via a communications linkage, information identifying a transaction to be bargained, a series of offers to satisfy a transaction made by or on behalf of a person involved in the bargain transaction, and a series of counter-offers to reach an agreement for the transaction by an entity opposite to the person for the transaction. In this embodiment of the system is memory means, accessible by the processor, for storing the information identifying the transaction and for temporarily storing the series of offers to satisfy the transaction and the series of counter-offers to reach an agreement for the transaction for use by the processor in a series of rounds without disclosure of the series of offers to the opposite entity or series of offers to the person. There are also embodied in the system comparison means, in communicating relationship with the processor, for receiving and comparing one of the series of offers and one of the series of counter-offers, against each other on a round-by-round basis, in accordance with preestablished conditions until either all of the series of offers and series of counter-offers have been exhausted or an agreement is indicated for a offer and a counter-offer in a round, such that, if the agreement is indicated the transaction is agreed upon for: (a) an amount, in accordance with a first preestablished formula, if the offer in the round in which the preestablished condition is met is less than the counter-offer and within a preestablished percentage of the offer in the round, (b) the offer, if the offer in any round is the same as or greater than the counter-offer, and (c) an amount in accordance with a second preestablished formula, if the offer is not within the preestablished condition in all rounds but the difference between a particular offer and a corresponding counter-offer is less than a preestablished amount. Also embodied are means for permanently inhibiting a reuse of an unsuccessful offer, or unsuccessful counter-offer, by the comparison means in a subsequent round; and means for communicating a result of the comparison to the person and the entity.

The system further comprises means for accessing actual agreements from other bargained transactions. Further provided is the system wherein the communication linkage is an internet connection. Also provided is the system wherein the communication linkage is a voice connection. Still further provided is the system wherein the series of offers to reach an agreement for the transaction comprise three offers. The system further comprises means for generating voice messages through a telephone linkage for guiding a user in a use of the system. The system still further comprises security means for preventing an access of the system until provision to the system of at least one of: a) an identification number identifying the transaction, b) a security code corresponding to the transaction, or c) an administrator code for the person or the entity.

The system further comprises time keeping means for associating an entry time with at least a first of the series of offers to satisfy the transaction and at least a first of the series of counter-offers to reach an agreement for the transaction. Also provided is the system wherein all of the series of offers and the series of counter-offers are received by the system at different times.

Another object of the invention is to provide a computerized system for automated bargaining through a communications linkage for communicating and processing a series of offers to satisfy a transaction made by or on behalf of a person involved in a bargain negotiation with at least on other person and a series of counter-offers to reach an agreement for the transaction through at least one central processing unit includes operating system software for controlling the central processing unit, means for introducing information into the central processing unit corresponding to the identification of the transaction and the persons involved in the transaction, and memory means for storing the information corresponding to the identification of the transaction and the persons involved in the transaction. Also embodied by the system are means for introducing by or on behalf of a first person involved in the transaction against whom a transaction is made information into the central processing unit corresponding to a series of rounds to reach an agreement for a transaction without disclosure of the offers to other persons involved in the transaction, means for introducing by or on behalf of a second person involved in the transaction information into the central processing unit corresponding to a series of rounds of counter-offers to satisfy the transaction without disclosure of the counter-offers to other persons involved in the transaction. Also embodied are comparison means for comparing the information corresponding to the series of offers and the series of counter-offers on a round-by-round basis in accordance with preestablished conditions includes (a) that the transaction is agreed upon for an amount in accordance with a first preestablished formula if the offer in any round is less than the counter-offer and within a preestablished percentage of the offer in the same round; (b) that the transaction is agreed upon for the offer amount if the offer in any round is the same as or greater than the counter-offer; and (c) that the transaction is not agreed upon if the counter-offer is not within the preestablished percentage of the offer in all rounds unless the difference between the offer and counter-offer is less than a preestablished amount in which case the transaction is settled for an amount, in accordance with a second preestablished formula. There are also embodied means for permanently deleting the offer and the counter-offer in each round that does not result in an agreement upon comparison of the offer and the counter-offer in said round based upon said preestablished conditions, and means for communicating to the first and second persons or representatives thereof the results of the comparison.

A computerized system as defined further comprises means for accessing actual agreements generated by the system in other bargained transactions. Further provided is a computerized system as defined wherein said persons communicate via the Internet to said central processing unit. Still further provided is a computerized system as defined wherein said persons communicate via telephone to said central processing unit. Also provided is a computerized system as defined wherein the central processing unit has received information corresponding to three counter-offers.

The computerized system as defined comprises means for generating voice messages to a person communicating with the system through a touch-tone or cell phone linkage to guide the person in the use of the system. The system also comprises security means whereby the system is accessible only upon entry of an identification number identifying the transaction, a security code corresponding to the transaction, and a user security code corresponding to the transaction and identifying the person or representative thereof who is making the offer or counter-offer. The computerized system as defined comprises time keeping means to record the introduction of the information corresponding to the offers or counter-offers over a period of time. Introduction of information corresponding to offers or counter-offers may be made in a plurality of communications with the system over a period of time. Further provided is the system wherein the markup language is Hyper Text Markup Language (HTML).

A method comprises: receiving a submission of a transaction to be bargained from a sponsor; receiving an agreement to at least one criterion which, if satisfied, would result in a binding agreement of the transaction; generating a message for communication to a representative of an entity to be paid involved in the transaction which invites the representative to participate in an automated bargaining negotiation for the transaction; receiving a responsive agreement from the representative to participate and to be bound by the automated bargaining negotiation, if the at least on criterion is satisfied by offers submitted by the representative and correlated counter-offers submitted by the sponsor; receiving an offer submitted by the representative and at least two counter-offers submitted by the sponsor, within a specified limited time period; comparing the offer and one of the counter-offers in a round of at least two rounds to determine if the at least one criterion is satisfied; and if the at least one criterion is satisfied, generating an indication that the transaction is agreed upon for a payment amount. The method further comprises: requiring entry of an identification number prior to receiving the offer and the counter-offer. The method still further comprises: storing the payment amount for future retrieval. According to the method the payment amount can be calculated as a median of offer and the counter-offer.

Another object of the invention is to provide a system comprising: a first value, submitted on line by a first entity; a second value, selected from at least two values submitted on line by a second entity, the first and second entities being opposite to each other with respect to a transaction, the first value being inaccessible to the second entity and the second value being inaccessible to the first entity, the first value and the second value being different in magnitude from each other. A proxy includes an input, an output and a computer executable program, the program being structured to, when executing, accept a pair of values from opposite entities via the input and return a result indicator to the proxy based upon a mathematical comparison of the pair of values in a round of at least two rounds. The program is further structured to provide a payment value for the transaction to at least one of the opposite entities via the output when the result indicator indicates that at least one predetermined criterion is satisfied for one of the at least two rounds. The system still further includes processor accessible storage configured to temporarily store the first and second values for retrieval by the proxy via the input. Further provided is the system wherein the computer executable program including a plurality of modules, one of which is programmed in an object oriented programming language and another of which is programmed in a markup language. Further provided is the system wherein the object oriented programming language includes JAVAScript. Also provided is the system wherein the markup language is ColdFusion Markup Language or Hyper Text Markup Language (HTML).

The system wherein, when the program is executed and the result indicator indicates that the at least one predetermined criterion is not satisfied, the proxy discards the pair of values is also provided. So too is the system wherein, when the program is executed and the result indicator indicates that the at least one predetermined criterion is satisfied, the proxy calculates the payment value from the pair of values and then discards the pair of values. Also provided is the system wherein the first value is an offer made by a sponsor and the second value is a counter-offer made by an entity to be paid.

The system further includes an entity accessible detail log includes a correlation of payment values and transaction specific information. Further provided is the system wherein the transaction specific information includes data indicative of a geographic area. The system further includes proxy accessible storage into which the proxy can store the payment value and data representing transaction specific information when the result indicator indicates that the at least one predetermined criterion is satisfied. Further provided is the system wherein the pair of values is the first and second values, the at least one predetermined criterion is satisfied and the payment value is the median of the first and second values. Still further provided is the system wherein the pair of values is the first and second values, the at least one predetermined criterion is satisfied and the payment value is the greater of the first and second values. The at least one predetermined criterion can be that the pair of values must be within a fixed percentage of each other.

The system further includes a predetermined override amount which will be compared to a differential between the pair of values if the result indicator indicates that the at least one predetermined criterion is not satisfied and, if the differential is less than the predetermined override amount, will cause the proxy to provide the payment value for the transaction to at least one opposite entity even though the at least one predetermined criterion was not satisfied. Further provided is the system wherein the pair of values is the first and second values, the at least one predetermined criterion is satisfied and the payment value is the median of the first and second values. Also provided is the system wherein the pair of values is the first and second values, the at least one predetermined criterion is satisfied and the payment value is the greater of the first and second values. Also provided is the system wherein the pair of values is the first and second values, the at least one predetermined criterion is satisfied and the payment value is a function of the first and second values. Further provided is the system wherein the at least one predetermined criterion is a fixed spread value. Further provided is the system wherein the payment value is of a magnitude between one of the values in the pair of values and another of the values in the pair of values.

The system further comprises transaction specific data indicative of a geographic area. The system further includes a time indicator which, when exceeded, will cause the proxy to take a predetermined action with regard to at least one of the first or second values. Further provided is the system wherein, the predetermined action is a discarding of the at least one of the first or second values. Further provided is the system wherein the first and second values are withdrawable and the predetermined action prevents a withdrawal of one of the first or second values. The system further includes an entity accessible detail log includes a correlation of payment values and transaction specific information. Further provided is the system wherein the entity accessible detail log is written in a markup language. The system further includes an exposure calculator which can be written in an object oriented programming language such as JAVAScript.

Also provided is the system wherein the first value is one of a plurality of sequentially submitted first values and the second value is one of a plurality of sequentially submitted second values, all of the sequentially submitted values being inaccessible to the entity that did not submit them, and wherein the program is further structured to utilize another of the plurality of sequentially submitted first values, specified by the first entity, in place of the first value and another of the plurality of sequentially submitted second values, specified by the second entity, in place of the second value when the result indicator indicates that the at least one predetermined criterion is not satisfied for the first and second values. The system wherein each of the plurality of first values is submitted by the first entity according to a specified order is also provided. The system further includes a program execution limit which provides a limit on a number of times—two or three, for example, that the proxy will accept the pair of values.

The system further includes a payment calculator which, when the at least one predetermined criterion has been satisfied, will calculate, in accordance with a formula, a monetary amount to be paid by one entity to the other to reach an agreement for the transaction. Further provided is the system wherein the formula is a median of the pair of values which caused the at least one predetermined criterion to be satisfied. Also provided is the system wherein the formula is the greater of the pair of values which caused the at least one predetermined criterion to be satisfied. The system further includes an entity searchable database includes data relating to settled transactions. Further provided is the system wherein the data includes geographic information for each bargained transaction. The system wherein the data includes a monetary amount for each bargained transaction is also provided. Still further provided is the system wherein the system further includes a communication link over which the entity searchable database can be accessed by an entity prior to submitting an offer or a counter-offer.

Further provided is the system wherein the first plurality of values are offers from an entity to be paid. The system wherein the first value is one of a plurality of sequentially submitted first values and the second value is one of a plurality of sequentially submitted second values, all of the sequentially submitted values being inaccessible to the entity that did not submit them, and wherein an acceptance of a pair of values by the program along with the returning of the result indicator constitutes a round.

BRIEF DESCRIPTION OF THE DRAWINGS

The following detailed description may best be understood by reference to the following description in conjunction with the accompanying drawings in which.

DETAILED DESCRIPTION OF THE INVENTION

Figure 1:
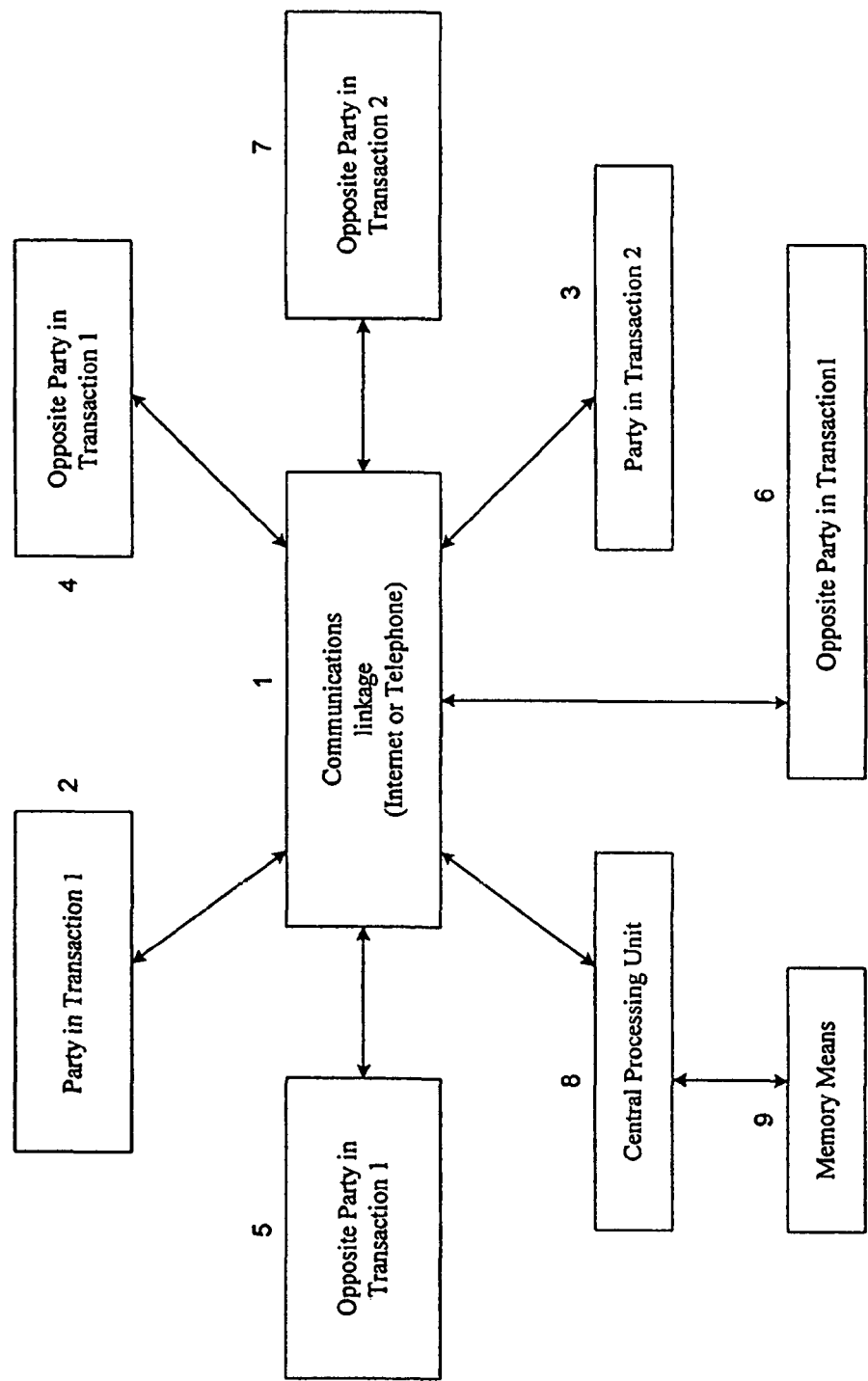
FIG. 1 is an overview of the computerized system usable to implement the present invention.

A computerized system for automated bargaining accessible on-line, for example through an Internet website via the Internet or other communications linkage is created for communicating and processing a transaction between two persons using a series of counter-offers to satisfy a transaction and a series of offers. Among the broad definitions for "bargain" Merriam Webster's Collegiate Dictionary defines bargain as: "to negotiate over the terms of a purchase, agreement, or contract"; "to come to terms"; and "to bring to a desired level by bargaining; to sell or dispose of by bargaining".

The system compares counter-offers and offers on a round-by-round basis in accordance with preestablished conditions.

An "offer" is the amount of money (or equivalent value) required by the person having a transaction opposite another person, such as buyer or his or her agent seeking to purchase real property, for which the person with the transaction would be willing to reach agreement. Information corresponding to the amount of the offer is entered by the party, or his or her representative, by using the numbers of a touch-tone or cellular telephone or the keyboard of a personal computer. A "counter-offer" is the amount of money (or suitable value) the opposite person, for example a seller or his or her agent with real property to sell, will reach agreement the transaction. "Counter-offer" and "offer" are used distinguish the amounts submitted by the opposite parties; it does not matter which party makes the offer or counter-offer nor is it required that an either the offer or the counter-offer precede one another.

A person involved in a transaction is anyone or any company who has a transaction against another person or against whom another person has asserted a transaction.

The system communicates and processes the offers and the counter-offers using at least one central processing unit by pairing offers and counter-offers and comparing them. The computer system includes operating system software for controlling the central processing unit, a way to introduce information into the central processing unit, and memory for storing the information.

The basic preestablished conditions under which the comparison is made include the following:

If the offer in any round is less than the counter-offer and within a preestablished percentage, for example thirty percent, of the counter-offer in the same round, i.e. the offer is greater than or equal to seventy percent of the counter-offer, the transaction is completed for an amount in accordance with a first preestablished formula, for example, the median amount between the counter-offer and the offer.

If the offer in any round is the same as or greater than the counter-offer, the transaction is completed for the counter-offer amount.

If the offer is not within the preestablished percentage of the counter-offer in all rounds, for example if seventy percent of the counter-offer is greater than the offer, the transaction is not completed unless the difference between the offer and counter-offer is less than a preestablished amount, for example $5,000, in which transaction the transaction is completed for an amount in accordance with a second preestablished formula, for example at the median amount between the counter-offer and the offer. Thus, first and second preestablished formulas may be the same as or different from each other depending on the agreement of the parties.

The system preferably is designed to allow a user to communicate with the system through a standard PC computer and modem via the Internet. The system may also include a voice message system or voice message generator to allow a person communicating with the system to do so through a touch-tone or cell phone linkage or to guide the person in the use of the system. Security is preferably included to make the system inaccessible without entry of the proper information, for example, a transaction identification number identifying the transaction, a security code corresponding to the transaction, and a user security code corresponding to the transaction and identifying the user, the user being the person or representative thereof who is making the counter-offer or offer, for example, the agent for the person on whose behalf the counter-offer or offer is made.

Preferably, the computer is secure, for example by the implementation of a "firewall" or protective barrier against unauthorized traffic or the use of encryption technology, and each transaction is preferably triple-password protected to assure privacy and prevent unauthorized access. For example, the system may require the user to enter a password or user identification number or alphanumeric combination and a user authorization code providing access control to the system. For increased security, systems may be designed which require user authentication, for example through the use of voice pattern, fingerprints, physical signature, or "smart" card. Advantageously, if the smart card is used, certain embodiments will allow an agreement to be completed by direct transfer of funds onto the party's smart card.

Still further advantages may be realized when transfer of the bargained value of a given transaction can be automatedly, if not immediately, be made to the party.

We have also recognized that some of the transactions which can not be completed using the basic configuration automated bargaining arrangement can nonetheless be completed in an efficient automated manner which has similar advantages but removes some of the rigidity of the basic arrangement through the use of either a facilitator, a "power" round or both.

We have also recognized that yet further advantages may be achieved when a windfall relative to a normal payment is provided to an initiator, i.e. the first opposite party to present a particular transaction for bargaining. Initiator opposite parties benefit in a savings because the payment they would make relative to a normal payment for a pair of values is less. Initiator parties benefit in a windfall increase relative to a normal payment for a pair of values.

In a fully automated system, offers and counter-offers that do not result in an agreement are never revealed to anyone. In a system implementing a facilitator, disclosure of information to the facilitation is limited and controlled.

Additional advantages may be achieved when agreement documents are automatically generated by the system for provision to the parties.

FIG. 1 shows the basic system using the Internet or a telephone as the communications linkage.

Preferably, the central processing unit receives the agreement offers and a party or party enters counter-offers in communications with the system within a period of time, for example, 30 days. Time keeping is performed to record the entry of the counter-offers or offers over the selected time period.

Preferably, there will be three offers for each transaction in a normal bargaining arrangement. In those instances, each counter-offer will be compared with the offer of the same number (i.e. Counter-offer #1 to offer #1, Counter-offer #2 to offer #2, etc.). The computer matches the agreement offer against the party's counter-offer and performs its programmed calculations in order to determine whether or not an agreement has been achieved. Where the counter-offer and offer intersect in accordance with preestablished conditions, agreement is reached. In the intersection transaction where the counter-offer is less than or equal to the offer, then the transaction is completed at an agreement amount equal to the counter-offer. In the intersection transaction where the counter-offer exceeds the offer, the system will preferably split the difference if the offer is also within a preestablished percentage, for example 70% of the counter-offer (i.e. counter-offer.times.0.70<=offer). In such transaction, the agreement amount is calculated to be the median of the two, i.e., the counter-offer plus the offer divided by two. If 70% of the counter-offer is still greater than the offer, there is no agreement unless the difference between the counter-offer and offer is less than a preestablished amount, for example $5,000, in which transaction the transaction is completed for the median amount between the counter-offer and the offer.

Additionally, as an option a "power round" option may be made available. With a power round, an additional opportunity is given, or a parameter is changed to increase the prospect of an agreement being reached.

Thus, in one type of arrangement, the parties communicate only with the computer which acts as a proxy, always avoiding direct communication with each other for purposes of bargaining. Wasteful personality conflicts, fruitless and unnecessary disagreements, posturing and positioning cannot occur, so the parties deal exclusively with the "bottom line".

Alternatively, a neutral facilitator may be used to assist with bargaining processes. The facilitator is a computer or a person operating with, or without a computer, according to particular guidelines. Through the use of generic, non-revealing statements, the facilitator the facilitator attempts to induce one or both of the parties to the transaction to adjust their offer(s) or counter-offer(s) into agreement range.

Figure 2:
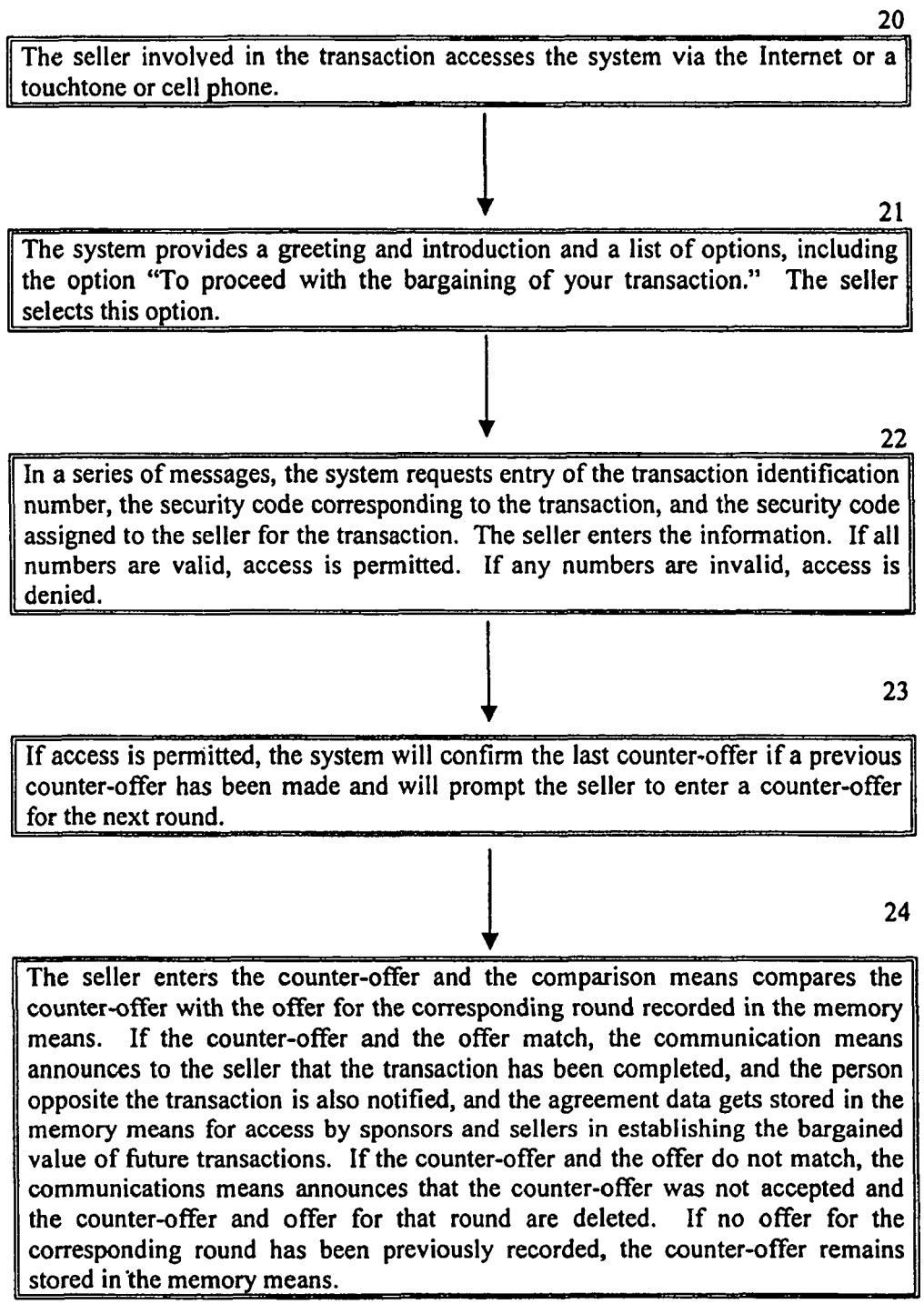
FIG. 2 is a block diagram showing how a party involved in a transaction interacts with the computerized system of FIG. 1.

FIG. 2 shows how a party involved in a transaction would use the confidential and fully automated system without direct communication with the other side.

The system preferably is also implemented securely so the system is accessible only upon entry of the proper authenticating information, such as a transaction identification number identifying the transaction, and a user security code corresponding to the transaction and identifying the person or representative thereof who is making the counter-offer or offer.

Preferably, the system is capable of generating voice messages to a person communicating with the system through a touch tone or a cellular phone linkage to guide the person in the use of the system. Alternatively, written messages maybe used as prompts when the system is accessed from a personal computer via the Internet.

The entry of transactions and agreement offers may also be expedited by a trained staff of computer professionals. For example, the website or telephone linkage can provide a series of options, one of which places the user into on-line or telephone communication with a customer service representative to answer questions or provide other assistance. Thereafter, the user may access the system by communicating to the processing unit via the Internet or by telephone, e.g. a toll-free number, at any time or day of the week to enter transactions or agreement offers. Preferably, the system also has time keeping implemented to record the introduction of the information corresponding to the offers counter-offers or counter-offers over a period of time. In this way, introduction of information corresponding to counter-offers or offers may be made in a plurality of communications with the system over a period of time. The system can of course be configured to handle multiple telephone calls or other communications from anywhere in the world.

Depending upon the particular implementation, a currency converter is also included. This allows adversaries to negotiate using different currencies, for example, U.S. dollars, Euros, Pounds, Lira, or Yen, without having to take into account the current exchange rate or negotiate using an unfamiliar currency. When offers or counter-offers are entered in such a system, the system automatically converts the offer and counter-offer into a common currency. Typically, this will be the currency specified by the selling party. Alternatively, the currency used can be based upon a joint selection by the adversaries, for example, a Japanese party and Canadian party could select the Euro as the basic currency of bargaining. The computer performs its functions and the result are reported to the parties as they occur in real time without waiting.

The system includes modules which act as a negotiator proxy. This encourages and enables sellers to take a realistic approach to agreement with no risk of appearing irresolute or hesitant since a seller's financial counter-offers that do not result in an agreement are never disclosed. Preferably, in the normal course, sellers have only three or some other previously agreed-upon number of opportunities or rounds to complete transactions using the system, and preferably agreement offers or rounds have only a limited period or "shelf life" in which they are operable, for example thirty days for all rounds, which encourages prompt action by parties.

The system preferably also collects and processes agreement data generated from an agreement reached through the operation of the system for dissemination and use by users, for example sponsors and parties, in establishing the bargained value of future transactions. Agreement data may also be used by facilitators in prompting one or both parties to adjust the amount they propose for agreement. Means may be provided for a user to access actual agreements achieved through the use of the system in other transactions, for example, through a menu or voice choice provided to the user via telephone or the Internet whose selection provides the user with information about prior agreements. The data may be tabulated in the memory so as to be accessible by certain categories, for example by sponsor, by geographic location, or by other category. In this way, a user of the system can be guided in making counter-offers and offers by actual agreements reached in similar transactions.

Since the system is accessible via telephone and/or the internet, parties need not have an agent in order to engage the system and complete a transaction. Furthermore, incentives for using the arrangement may be provided, either directly, by giving a windfall to the party who engaged the system for the transaction first, or indirectly, through various payment options or tie-in arrangements.

Various enhancements can also be provided to assist the agreement process. For example, the system may be constructed to generate agreement documents for the parties such as contracts or warranties. A further example of an agreement document is an airline ticket which could be generated where a party bargained with an airline for a seat on a given flight.

The invention can be understood readily from the following description of a number of preferred embodiments, with and without particular enhancements, in conjunction with the overview of FIG. 1. The present invention provides an online system, preferably Intranet website via the Internet or telephone accessible or both, to facilitate the completion of transactions by allowing agents, parties to use a simple interface to rapidly post a series of monetary transactions for a transaction to be tested against an algorithm for possible agreement. Preferably, the system also calculates, stores and tabulates agreement data, once an agreement has been reached, for reference by other users and/or a facilitator.

A person opposite another person involved in a transaction, such as a buyer or an agent or other sponsor, preferably submits transactions to the computerized system using electronic media and formats agreed upon by the parties. The sponsors preferably can also describe the algorithm amount and percentage, and at the individual transaction level, check their potential exposure for transactions with a built-in calculator provided by a computer program in the system.

Parties can make counter-offers directly, without hiring a agent, and calculate potential agreement gains for their counter-offers. Parties may become aware of the system through advertising, word of mouth, links provided on selected websites and/or through affinity or partnership arrangements.

Agents for a party can make counter-offers in return and calculate their potential agreement gain. Parties or their agents may be invited to participate in the process by an automatically generated letter that is sent out once the sponsor enters the transaction. The parties or agents may then log into the system by special authorization codes provided in the letters.

The parties involved may agree in advance to the algorithm amount and the percentage, or a first person involved in a transaction may enter this data which is then agreed to by the second person. Additionally, the parties may agree to allow for a power round. Depending upon the particular implementation, the power round may involve an additional round, a variation in some criteria and/or an agreement to alter the payment if an agreement is reached. The parties may also be subject to a windfall adjustment, based upon who engaged the system first for the transaction.

In an Internet-based embodiment of the present invention, an Internet website is set up to provide the interface between system and user. Preferably, the major areas of the website include a login area for sponsors or their representatives, a login area for parties or agents for parties, and a login area for administration personnel who oversee the system. If desired, the website may also include a publicly accessible area that highlights information about the system. For increased security, a separate website may be set up with this information.

Individuals using the computerized system preferably must log into the system before they can manipulate any data. Preferably, they can view, enter and change only that information that is within their access limits—as an agent for party, a directly accessing party, a sponsor user, a sponsor administrator, or a system administrator.

A sponsor user is an agent who works for a sponsor, for example an organization offering credit or loans, which has entered into an agreement to use the computerized system. A sponsor user is preferably limited to entering and reviewing transactions relevant to their own entered transactions, not transactions entered by other sponsor users of the same sponsor.

Thus, a sponsor user preferably may enter the website to login to the system, for example by using a user name and password combination or pair, read and agree to an agreement for the sponsor's participation in the system, assign new transactions for party agent participation, and review any completed, pending or in-process transactions that have been entered into the system by that sponsor user.

A sponsor administrator is a sponsor user who has been granted administrator privileges by the sponsor. Preferably, in addition to performing all the tasks that a regular sponsor user may perform, a sponsor administrator may enter the website to change sponsor contact information, change sponsor user login and contact information, add or delete sponsor users, create sponsor users with administrator privileges, and review transactions for all sponsor users within the sponsor.

Parties or their agents may enter the website to login to the system preferably using a username and password pair, read and agree to a system participation agreement for the party, and review transaction information as prepared by the sponsor, with current transaction status information.

Preferably, system administrators who work for a company administering the system assist in the implementation of the system. System administrators with proper authorization, for example username/password combination identifying them as such, may enter the website to review, modify, delete and create sponsors, sponsor users, and sponsor administrators, and review, modify and delete and create transactions or transactions to be processed by the system. Preferably, a transaction report writer may be provided containing current transaction status information searchable by date, sponsor, sponsor user, transaction name and status, which is able to be accessed or queried by the system administrator. A more limited form of transaction report writer may also be provided to parties and other users of the system in which only information that is within the user's access limit may be searched.

The system of the present invention is preferably designed to make it easy for either a party directly engaging the system, or a seller's agent using an on-line connection such as a common Internet browser or telephone to access the system and attempt to complete a transaction involving a quantifiable agreement amount.

In using the system, the sponsor accesses the system, for example, with a login to the website. The sponsor may at that time enter any pertinent transaction information about the transaction and the party agent. After adding or reviewing transaction details, the sponsor submits all at once or over time a number of agreement offers, preferably up to three, for each transaction submitted. Each agreement offer is identified by Round. For example, a sponsor may enter $4,000 as the offer for the first round (Round 1), $6000 for the second round (Round 2), and $8000 for the third round (Round 3). If a power round option is available, the sponsor may also be prompted for information for use in the power round, if one is necessary.

If desired, in website based systems, an online calculator may be used to notify the sponsor user at that time as to what the sponsor's highest potential exposure might be. For example, if the preestablished conditions are such that the transaction will be completed at the midpoint between the counter-offer and offer if the offer is at least 70% of the counter-offer or within $500 of the counter-offer, whichever is greater, a sponsor user who enters $7000 as the offer for a round may calculate that the possible exposure is $8500 (corresponding to a $10,000 counter-offer, i.e. the highest counter-offer that will trigger an agreement under these conditions).

Once the transaction is entered on the system, the party or party's agent is contacted, for example by ordinary or electronic mail. (For simplicity, the party's agent will be used but the discussion applies equally to the party and to other representatives of the party). The party's agent chooses an agent security code, which is preferably a unique numeric personal identification number ("pin number") that permits the agent to access the computerized system. The party's agent must also agree to be bound by any agreement achieved by the parties using the computerized system and may also at this time agree to the percentage within which a counter-offer and offer in a round must be for agreement to occur, the formula for determining the amount of the agreement, the amount which may be zero in which the transaction nonetheless will reach agreement if the difference in the counter-offer and offer in a given round is less than or equal to that amount, and the formula for determining the amount of the agreement in that instance. The transaction is now ready for agreement, and the party's agent will preferably have three normal Rounds, or opportunities, to complete a transaction, which may be entered over time or all at once.

Referring now to the block diagram of FIG. 2, the party agent or other user (for example a buyer or sponsor) accesses the system via the Internet using any standard web browser or via an ordinary touch-tone or cellular telephone. No special equipment or training is needed by the agent to use the system. The system "prompts" the agent at each step of the process and provides automated, on-counter-offer help if needed.

Figure 3:
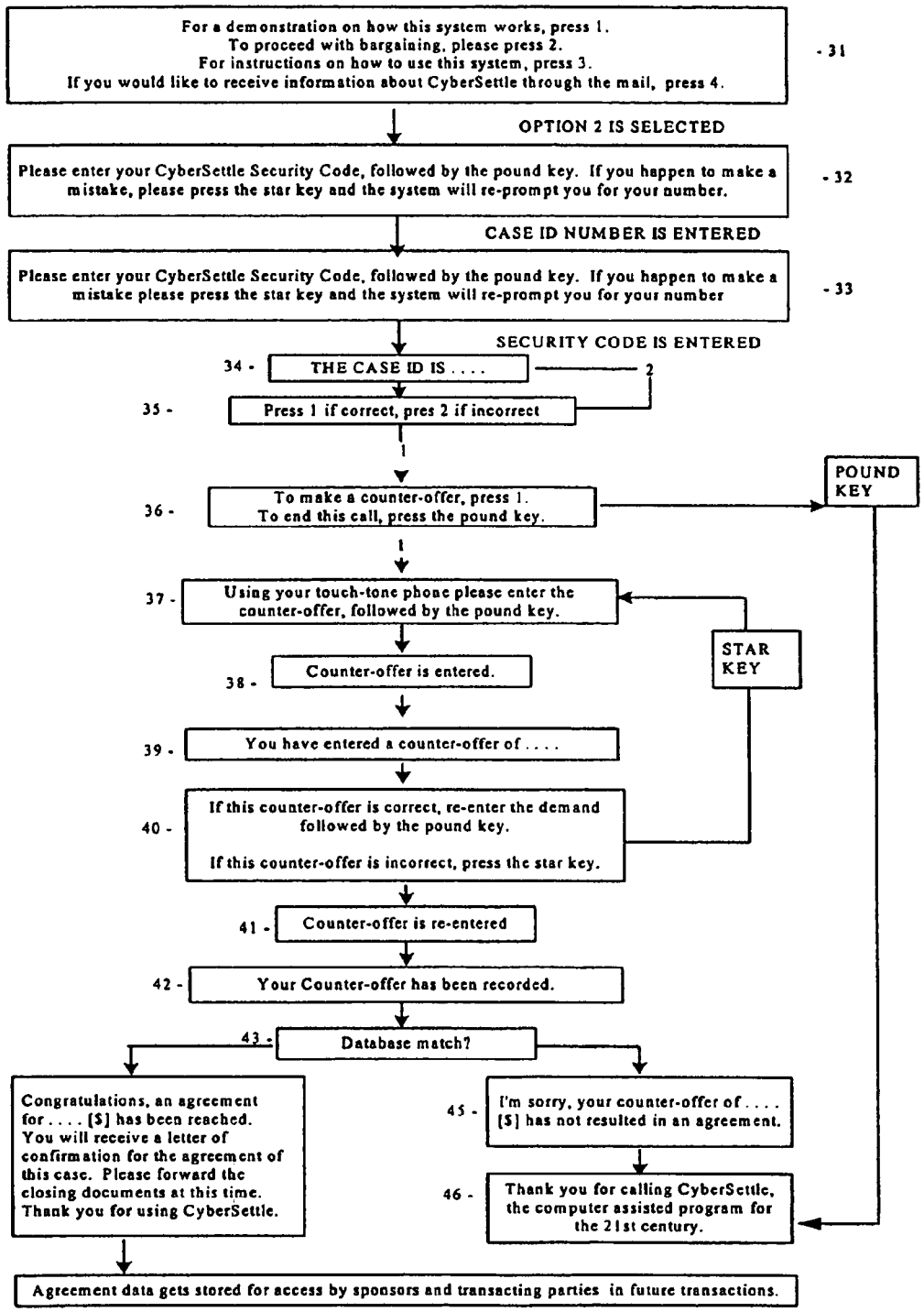
FIG. 3 is a block diagram of an example of how an embodiment prompts a person involved in a transaction in the use of the system.

For example, referring to the block diagram of FIG. 3, upon accessing the system, the user is met with a greeting (step 30) followed by a number of options that may be selected by pressing the appropriate number of a touch-tone or cellular telephone (step 31).

In steps 32-35, the agent's pin number and preferably two numeric "passwords" are required to commence the bargaining of a transaction. The system preferably generates a voice confirmation of the information which the user may confirm or cancel and reenter the information (see step 34) The system may, upon confirmation of the information, determine the correctness of the information and the user's authorization to access the system for that transaction. After entry and confirmation of the required numbers, the agent follows the prompts and enters counter-offers using the telephone keypad or by typing in the counter-offer at his or her personal computer. The system may also request confirmation of information entered by the agent. See FIG. 3 for telephone-based embodiments.

The computerized system is designed to adhere to the will of the parties and makes no attempt to "force" an agreement. The transaction can only be completed only at a figure agreeable to the parties, not at some figure arbitrarily set by an interviewing third party. Even when a facilitator is used, the facilitator may only make rule driven or generic statements designed to "nudge" the parties into the agreement range and is preferably not directly privy to any of the counter-offer(s) or offer(s) made in a subsequent round. Thus, the parties can bargain fairly using the system without relinquishing agreement authority.

Rounds may preferably be completed in one, two or three calls or computer sessions within a given time period, preferably thirty days. Once entered, the system instantly and in real time compares each counter-offer to the agreement offer for each Round. If the counter-offer and offer match or are within some preestablished range, the transaction is completed. For example, if the offer is within twenty percent of the counter-offer, the transaction is completed in accordance with a preestablished formula, for example the transaction is completed for the median amount. If the offer and counter-offer differ by more than twenty percent in all three Rounds, the transaction will not be completed or, if available, will invoke a power round. If, during the normal rounds, the agreement offer is the same as or greater than the party's counter-offer, the transaction is completed for the counter-offer amount.

Preferably, the preestablished conditions are such that even if the offer and counter-offer differ by more than a preestablished percentage in all three rounds, the transaction will nonetheless be completed if the offer and counter-offer are within a preestablished amount, for example $5,000, in which transaction the transaction will reach agreement in accordance with a second preestablished formula, which may again be the median amount.

Two examples of a series of normal rounds and the results are given in Table 1. In these examples, the first preestablished formula is the median amount between the offer and the counter-offer. In Example 2, the preestablished amount is $5,000 and the second preestablished formula is the same as the first preestablished formula, i.e. counter-offer plus offer divided by two equals the agreement amount.

TABLE 1

EXAMPLE 1 (preestablished percentage: 80% of counter-offer)

| Round | Party's counter-offer | Agreement Offer | Result |
|---|---|---|---|
| 1 | $200,000 | $40,000 | No Agreement |
| 2 | $150,000 | $60,000 | No Agreement |
| 3 | $100,000 | $80,000 | Completed for $90,000 |

EXAMPLE 2 (preestablished percentage: 70% of counter-offer)

| Round | Seller's counter-offer | Agreement Offer | Result |
|---|---|---|---|
| 1 | $19,000 | $4,500 | No Agreement |
| 2 | $14,000 | $6,500 | No Agreement |
| 3 | $12,000 | $8,000 | Completed for $10,000 |

Preferably, the system promptly notifies the parties of an agreement, for example while the user is online or via email to offline parties or by telephone, and follows that notice with a written confirmation. Unaccepted offers and counter-offers expire without further action by any party, preferably after thirty (30) days.

The processing of the transaction data begins when a person involved in a transaction, preferably a party representing a person against whom a transaction or series of transactions is made, for example a sponsor, or an unrepresented party engaging the system, enters into the central processing unit a series of rounds of offers for a transaction (or if the party, a series of rounds of counter-offers to complete the transaction). The information as to a transaction is submitted electronically in a format compatible with the system, for example via phone input or PC input fed for processing by the central processing unit.

Another person involved in the transaction, for example, when the first entity for the transaction is a sponsor, a party representing a person bringing a transaction enters a series of counter-offers to complete the transaction into the system. The counter-offers and offers are entered without disclosure to other persons involved in the transaction. The series of counter-offers and the series of offers are paired up and compared on a round-by-round basis in accordance with preestablished conditions. For example, the parties may agree to be bound to reach agreement the transaction if the counter-offer and the offer in any given round are identical (in which transaction the transaction is completed for that amount) or are within a previously agreed-upon range or formula, for example, within 20% or $5,000 or some combination (in which transaction the transaction is completed in accordance with a previously agreed-upon formula, for example at the midpoint between the counter-offer and the offer). Otherwise, the system goes on to the next round and the values from the previous round that did not result in an agreement are normally deleted. After each round the system communicates to the parties the result of the value comparison, i.e. no agreement or completed at a certain amount.

The computerized bargaining may be implemented in Internet-based embodiments using a computer program representing a distributed database application written in a Mark-up Language such as ColdFusion Markup Language and HyperText Markup Language (HTML). The system preferably is distributed through ColdFusion Server extensions which allow for interactive processing and Microsoft's SQLserver to allow agents and loan officers to access it via a standard web browser such as versions 3.0 and up of Microsoft Internet Explorer and Netscape Navigator, which can be found on a variety of platforms, including Microsoft Windows, Macintosh, and UNIX-type operating systems.

Information entered for a transaction is submitted to a central database via the Internet. The database preferably indexes sponsors, sponsor users and administrators associated with that sponsor, and transactions associated with that sponsor. It also preferably indexes agents associated with transactions.

Preferably, if a period of time passes without activity when a user is online, for example 20 minutes under normal network traffic conditions, the user is automatically logged out for security precautions. For all or a portion of the data, the system may be designed so that once data has been entered, a sponsor or other user has a period of time, for example 30 minutes, during which it can be modified or withdrawn but after which the data cannot be withdrawn.

Figure 4:
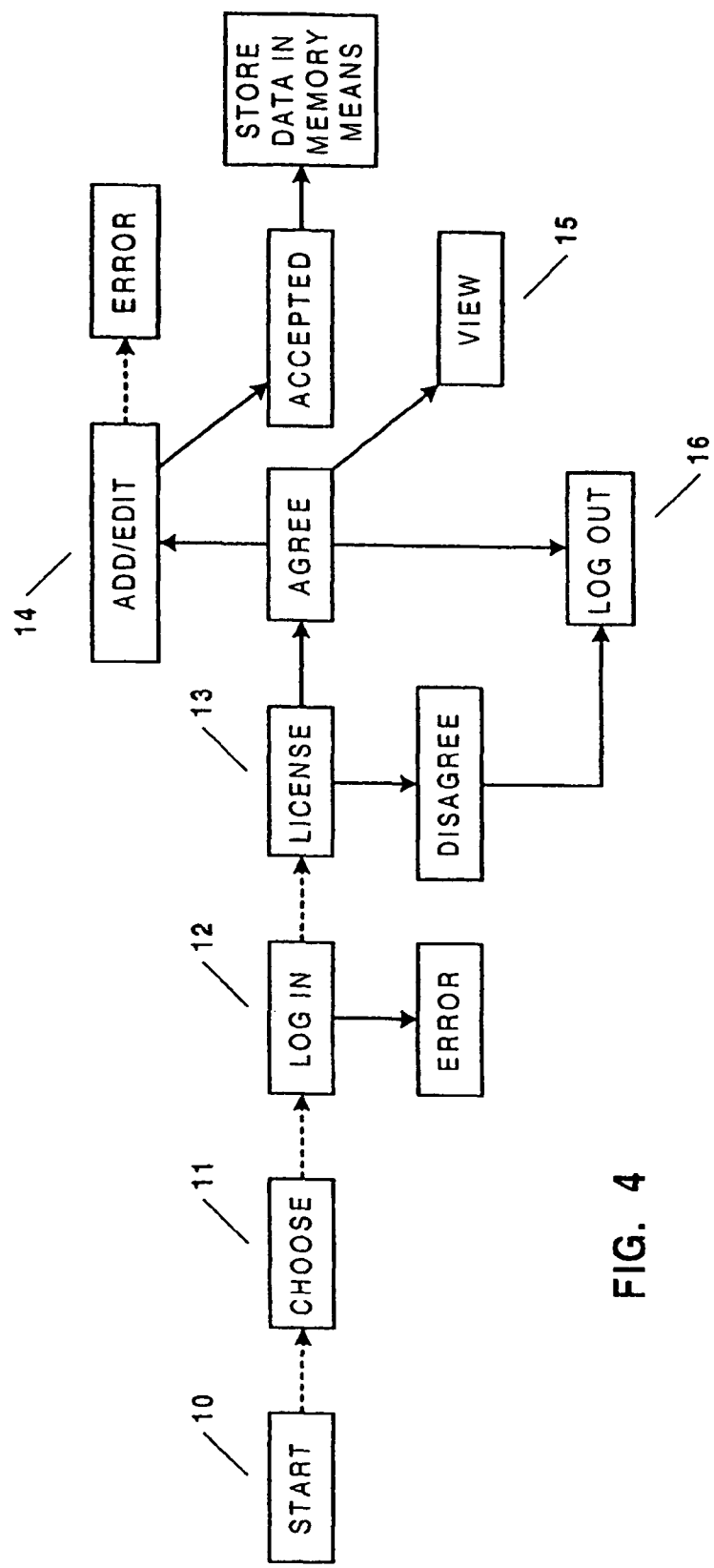
FIG. 4 is a diagram showing the program flow from a user perspective in accordance with a preferred method for operating the system of the present invention via the Internet.

Referring now to the flow chart of FIG. 4, the preferred computer program implementing the system in a normal multi-round bargaining enters at step 10 when a sponsor user opens their web browser (for example Netscape or Microsoft Internet Explorer 3.x or 4.x) and accesses the system website. The user is prompted by a menu with a series of options, one of which is "enter as Sponsor" which is chosen. If desired, the system may automatically write information in the form of ASCII text or "cookies" onto the user's hard drive as a means of keeping track of the user and the user's use of the system. Preferably, the memory means stores this information. Upon access to the system by the user, any preexisting cookies of the user may be modified to reflect the current access of the system by the user. Unless the user has explicitly denied cookies on his or her browser, the computerized system checks for the user's name through a variable saved in the user's browser. If the user has logged in before, the user is greeted by username, provided the user is logging in with the same computer. In step 11, the sponsor user is presented with the choice of adding/editing transactions, viewing all transactions for that sponsor, or logout. As mentioned previously, preferably all or a portion of the data in the system may not be withdrawn after a period of time in which event the user will no longer be permitted to modify that information. Preferably a menu is provided in which the user may choose one of two links to separate functions. For example, a menu bar may be provided on the left hand side of the screen in which the user chooses by clicking on the appropriate box in the menu bar corresponding to the function. The user's choice is saved through intermediate login and contract screens which follow. Alternatively, step 11 may be implemented following login (step 12) discussed below.

The program next moves to step 12 in which the user must first log into the system before editing or viewing transactions. The user must enter a username (unique to the entire database) and a corresponding password. If these do not match the pairs known by the system, the user is shown an error screen with the option to try again.

Alternately, if the user has logged in before with the same computer, his or her username may already be entered into the system, and the server which distributes the web pages checks the user's password against the username. If desired, the system may be designed so that the user has the option to enter a new or different username to allow multiple users to access the system from the same computer.

Computer program modules preferably are written to implement the various steps of the process. For example, a module controlling the sponsor user identity process may be created to hold all variables related to a sponsor user's identity and to transactions of that sponsor.

A "ValidateNewUserName" module may be created which is called when the user places an entry in the user name field and leaves the field form. Preferably, the user name entry form has a JavaScript object which checks to see if the username has already been taken, and if so, displays an error message.

Step 13 shows the user a system participation agreement if the correct name and password were entered. The agreement preferably details the terms of use of the system and details regarding the process. Preferably, a button is provided on the menu for either agreement or disagreement with the contract. If the user agrees to the terms of the contract, he or she proceeds to the original menu choice (adding/editing transactions, or viewing transactions) otherwise, the user is returned to the login screen with all information cleared.

If the user agrees to the participation agreement, the system may send the user to the original menu choice in step 11. Alternatively, the system may be designed to send the user to a menu with the options of assigning a new transaction, reviewing transactions, adding/editing transactions or logging out.

If the adding/editing transactions choice was originally chosen, the program enters step 14 where an Add/Edit transaction screen preferably allows the sponsor to enter the following information into the database:

Party name
Transaction Description
Sponsor Transaction ID
Values for each of 3 agreement rounds
The Party Agent name, firm, address, city, state, zip code telephone, fax, and email In telephone-based embodiments, some or all of this information may be entered with the assistance of system administrators.

The Sponsor transaction ID is preferably a number used for sponsor internal tracking selected by the sponsor.

The value inputs need not all be entered at one time. The system will prompt the user to enter an amount for each round individually with the option to leave the amount for any given round blank (for entry, if necessary at a later time).

The dollar value inputs preferably include calculator functions which calculate the total possible exposure for the amount entered. The screen also may display the status of the transaction. Upon submitting the information, the user may be returned a confirmation screen with all entered information upon which the user can choose to accept the changes or return to edit the transaction further. Preferably, the system provides the user with a period of time, for example, thirty minutes, to edit some or all of the transaction information before that information becomes final and is analyzed if corresponding values have also been submitted for the opposite party. Information made final but for which there is no corresponding counterpart, (e.g.: after the period of time has expired), may be edited or withdrawn preferably only by agreement of all the parties.

Preferably, the Add/Edit screen includes a "submit" button at the bottom, which sends the information to be checked for formatting. It points out missing or improperly formatted text, or returns the text for verification. If the text is accepted, the data is sent to the database for entry as an addition or update. Preferably, a sponsor user cannot edit a transaction in which the party agent has started to submit counter-offers into the system, except to change clerical information such as address and phone number.

A "TransactionDataEntry" module may be created to hold a template that processes the sponsor user's entry of transaction data and add/insert it into the database. The main features of the program are the checking of an expired edit time, and whether or not the party agent has entered a counter-offer in the system. In either event, the form aborts and an error message is presented.

Preferably the program is written so that when a record is to be inserted, the insertion is held up and locked using a suitable program until the system can read the record in order for the details to be displayed back to the user within the screen for confirmation and in order that the system can provide a HREF to its primary key which is automatically assigned by the database.

Another module called "SponsorAssignsTransaction" preferably drives the sponsor user's entry of a transaction into the database. The Add/Edit calculator may be any suitable computer program, such as a JavaScript program, which applies the algorithm amounts specified by the sponsor to determine the maximum possible exposure.

If the original choice was viewing all transactions, the program moves to step 15 where the View transactions screen reveals all the information for a given transaction which has previously been entered during an Add/Edit choice. The user is also preferably given an option to edit the information, preferably with a specified time limit (e.g. 30 minutes) for the rounds of offers provided a party agent has not started to submit offers or counter-offers. The View screen may, if desired, also display a list of transactions that have been assigned to a sponsor user.

Preferably, a module called "SponsorUserShow" contains a template which shows the user these records. If the sponsor user has administrator privileges, the module shows all user records related to the sponsor. A similar module called "SponsorShowTransactions" preferably functions to show transaction information.

In step 16, the user may log out of the system from a menu choice to end the session and return the user to the login screen. This menu choice preferably also follows completion of the Add/Edit and View choices of steps 14 and 15. If a user attempts to engage the system again, he or she will have to login their user name/password pair. Preferably, logging out clears the password but not the user name, so that upon subsequent login the computerized system may check for the user's name in the user's cookie if the user accesses the system with the same computer.

The screens appearing in the operation of the system may be created by suitable computer programs written in a Standard Generalized Mark-up Language such as ColdFusion Script.

The computer program code for the Login screen creates the login form if a user is determined not to be in a logged in state. (FIG. 4, step 12). This form preferably passes on a variable value indicating the user's eventual destination.

The module for the License screen follows the Login program and checks the user's authentication credentials if the user passes, the License screen is shown (FIG. 4, step 13).

Preferably, a module called Login results follows the License module and sets the user state to logged in. Unless the user has explicitly denied cookies on his or her browser, the program also checks to see if the user's cookie has taken correctly and sends an error message if it does not. If all is correct, the module sends the user on to his or her selected destination.

A Logout module may be used to log a user out of the system. Preferably the next time the user tries to use a menu item, he or she will be prompted for a password and to approve the license agreement.

If the user disagrees with the license, a module following the License module displays the Disagree screen which preferably indicates that the user must agree to the license in order to use the system.

An Access Denied screen may be created to show a user who attempts to access a section he or she does not have authorization for.

A Default page for debugging purposes may also be used to show current user login status. Preferably, this page is for a system administrator, and other users would normally not be able to access this page without mentioning it explicitly.

The above-described steps preferably apply equally to sponsor administrators (sponsor users designated with administrator privileges by the sponsor). However, the system preferably may be designed so that if the user is identified as holding administrator privileges, he or she will see an enhanced version of the sponsor user menu. In addition to providing the user with the option to assign a new transaction, review transactions, and logout, the sponsor administrator menu provides the options to change sponsor information, change his or her own user information, add a user, show/edit users, and remove a user.

If the change sponsor information option is selected, the program sends the user to change the sponsor information screen which allows the user to add/edit sponsor information stored in the database, including:
Sponsor Name
Address
City
State
Zip Code
Phone
Fax
Email If the remove a user option is selected, the program sends the user to user information screens which the sponsor user administrator can use to change, delete, or add information to any sponsor user's record to which they have access for their sponsor.

For example, the user information screen may allow the user to add/edit the following information into the database:
User Name
Sponsor Name
Address
City
State
Zip Code
Telephone
Fax
Email
Username
Password
Active User (yes or no)
Administrator User (yes or no)

Computer modules preferably contain the screen forms for entering and editing sponsor user and new sponsor user information. These modules also may screen users for administrator privileges, for example, before allowing the user to edit records.

Many of the above-described steps preferably also apply to a party agent, i.e. an agent that represents an individual or company that has transaction or has initiated a transaction with a sponsor who has entered into a participation agreement to use the system.

The agent may be notified, for example, by regular mail, that he or she can login to the website and submit a specified number, for example three, of offers or counter-offers to satisfy a transaction according to preestablished conditions. The agent may be required to sign a participation agreement, preferably mailed to him or her, before given the proper login credentials. Once the agent signs and forwards the agreement to the system administrators, the agent is given the proper login credentials.

In a similar manner, a party may contact the system to submit a transaction without going through an agent. The party may be required to sign or otherwise acknowledge being bound in accordance with the participation agreement, and in some transactions tender some form of payment, to engage the system.

As in the transaction of sponsor users, the party agent opens his or her web browser and accesses the system website (See FIG. 4, step 10). The agent, however, chooses an "enter as Agent" option provided on the menu that appears.

In step 11, the agent is presented with the choice of reviewing transactions placing counter-offers on transactions assigned to the agent. Preferably a menu is provided in which the user may choose one of three links to separate functions via a menu bar on the left-hand side of the screen. As in the transaction of the sponsor user, the party agent's choice is saved through intermediate login and contract screens which follow.

The program next moves to step 12 in which the user must first log into the system before making counter-offers or viewing transactions. A "Login" computer file for an agent similar to the "Login" file for the sponsor preferably implements this step. Preferably, the user must enter a transaction identification number, a security code, for example, an internally generated random number which functions as a password), and an agent security code (preferably, a code generated by the sponsor). If these do not match the information known by the database, the user is shown an error screen with the option to try again.

As in the transaction with the sponsor user, step 13 shows the party agent a system participation agreement if the correct name and password were entered with the same options and results discussed previously. A "License" file similar to the "License" file for the sponsor user preferably implements this step.

If the user agrees to the terms of the agreement, he or she proceeds to the original menu choice (reviewing transactions or making counter-offers). Alternately, the system may be designed to send the user to a main menu with the options of obtaining transaction information, placing a counter-offer for the next round of the particular transaction or settling a different transaction. A "Login-Results" file and a "Disagree" file similar to corresponding files for the sponsor-user follow the "License" file to implement this step depending on whether the party agent agrees or disagrees. Similarly, "Logout", "Access-Denied", and "Default" files corresponding to similar files for sponsor users preferably are provided.

If the transaction information option was selected, a transaction information screen is provided which preferably allows the party agent to view the following information from the database:

Transaction Name
Status
Seller Name
Agent name
Agent firm
Agent address
Agent city
Agent state
Agent zip
Agent telephone
Agent fax
Agent email Preferably, the screen displays the current status of the transaction with the corresponding details of the transaction without the ability of the agent to edit any of this information. A module controlling the transaction status process may be written to hold all variables related to an agent's transactions.

An "AgentTransactionInfo" module may also be created which displays the information an agent needs to start making counter-offers against a transaction. Preferably, the data in the module may not be withdrawn.

If the next round with current transaction option was chosen, the program moves to a Next Round screen which provides the agent with the option to place a counter-offer against a particular transaction. A "TransactionNextRound" module may be created to form a template which determines what the next round is, if any, and places a bid form in front of the user. Preferably, the screen provides a form box in which the agent places the counter-offer, and if desired menu options to either test the counter-offer against the exposure calculator (preferably implemented by a JavaScript program applying the algorithm amounts specified by the sponsor) to determine the lowest possible amount the transaction will be completed for, or to submit the counter-offer.

After the agent submits the counter-offer for the next round, the transaction is submitted for comparison. A "TransactionNextRound" module may be created to form a template to determine the results of the comparison based on the information that the party submitted on the TransactionNextRound form and on the preestablished conditions. Preferably, the preestablished conditions are determined on a sponsor by sponsor basis but may also be transaction specific.

If the counter-offer and the corresponding offer by the sponsor for a given round are within the preestablished conditions, the user is preferably presented with a transaction acceptance screen. If the counter-offer and the corresponding offer are not within the preestablished conditions, the user is preferably presented with a link to the next round screen, if a round is available, i.e. the previously agreed number of rounds of counter-offers has not been used and a power round is not available. If a round is unavailable, for example, the parties have agreed to three rounds and the party agent has entered three rounds of counter-offers, the user will see a message that the transaction is now closed in the system.

If the user is presented with the transaction acceptance screen, the transaction is completed and the party or agent is notified of the dollar amount of the agreement, and preferably the details of where to send the final agreement request (e.g., the sponsor's address). Parties can also be notified of other information pertinent to the transaction, for example, shipping information for a product sold in the transaction. As shown in FIG. 4, the system preferably is designed so that upon completion of the transaction, data for the agreement is collected and stored for access and use by sponsors and parties in establishing the bargained value in future transactions.

Preferably, the system is administrated by a system administrator who may be an employee of a third party who has been granted login rights to the administration function of the system for the purpose of adding sponsors, generating reports, or performing customer service on the website.

The system administrator reaches the website by opening his or her web browser, pointing it at the website interface and entering in appropriate identification numbers or passwords identifying him or her as an administrator. A module may be created which contains an administrator form for the assignment or editing of a transaction.

The administrator may then be presented with an administrator menu which provides the following menu choices:

Sponsor options, including the options to add/edit a sponsor and to show a list and links to all sponsors;

User options, including the options to show users (preferably a list and links to all sponsor users, searchable by user name and sponsor name), to add a new user, and to delete a sponsor user;

Transaction options, including the options to show transactions preferably by a list and links to all transactions, searchable by transaction name, sponsor name, start date, end date and status, to assign a new transaction, and to delete a transaction; and Site options (testing modules) including the options to clear cookies for the purpose of losing stored login information, to logout for the purpose of logging out the system and if desired to clear cookies, and to show login status for current login details.

Preferably, modules may be created to facilitate these options. For example, an "AdminNewSponsorUserEntry- Form" module may be created which contains an entry form to enter a new sponsor user. Preferably, this form is different from the regular form because of the username checking that occurs during the user's interaction with the page.

An "AdminGetSponsorNewTransaction" module may be created which chooses a sponsor for the purpose of adding a new transaction. Preferably, the identity of the sponsor should be known when a transaction is added so that the transaction may be properly assigned to a sponsor user.

An "AdminShowTransactions" module may also be created which shows all open transactions in an administrator form.

An "AdminSponsorUserDataEntry" module may also be created to hold a template which inserts or updates a sponsor user. The module makes a query to obtain the primary identification of the user, if the system does not have this information, in order for the system to set an edit link.

An "AdminSponsorUserEntryForm" module may also be created to hold a template representing the entry form for sponsor user administrator information.

An "AdminUserShow" module may also be created which an administrator form to show all users.

A "TransactionDataEntry" module may also be created which a form to enter/insert transactions into the database. If the Add/Edit a Sponsor option is chosen, an Add/Edit screen preferably appears to allow the administrator to the following information from the database:
  Sponsor name
  Address
  City
  State
  Zip Code
  Phone
  Fax
  Mail
  Algorithm amount
  Algorithm percentage
  System ID
  Active Account (yes or no)

"SponsorDataEntry", "SponsorEntryForm", and "SponsorShow" modules may be created to add a new sponsor to the database and show a return page, to contain an entry form to enter a new sponsor, and to show a table of all sponsors entered into the system.

"ValidateNewUserName" and "ValidateUserName" modules may be created which check to see if a username exists in a sponsor table and if so, display an error message. Preferably, these modules are called from a JavaScript lost focus event. The ValidateNewUserName module preferably gives no consideration to the current username as it assumes that there is none.

The Delete User option provides the administrator with screens in which the administrator can change, delete or add information to any sponsor user's record as in the transaction with the sponsor administrator's remove a user option. Preferably, a "DeleteUser" module and a "RemoveUser" module may be created which show the form that allows a user to delete a sponsor user and perform the database call to remove a user.

The Add/Edit transaction option provides the administrator with an Add/Edit transaction screen similar to the sponsor administrator's Add/Edit Transaction screen. In addition, the system preferably allows the administrator to add transaction status information including:
  Transaction Status
  Last sponsor edit (date-time)
  Edited by
  Sponsor name
  Last agent edit (date-time)
  Last administrator edit (date-time)

A "DeleteTransaction" module and a "RemoveTransaction" module may be created to show the form that allows the user to delete a transaction and to perform the database call to remove a transaction.

Preferably, the system also provides a report writer or searchable module of transaction information for reporting purposes. By querying the report writer, the status of any number of transactions may be viewed by the administrator for the purposes of internal reporting.

Preferably, transaction information may be searched based on the following criteria:
  Transaction Name
  Sponsor name
  Status
  Assigned date (start and finish dates)
  Modified criteria (start and finish dates, for example, all records modified in a particular day) Show only records unmodified by an agent The selected platform and hardware to implement the system should be scalable enough to handle large loads of traffic and data, while being responsive to user requests.

Similarly, the database chosen should be scalable enough to handle a distributed data environment, and to be able to handle large loads of data, while being responsive to user requests.

The application server likewise should be scalable enough to handle a distributed data environment, and to be able to handle large loads of data, while being responsive to user requests. Preferably, the application server is a popular platform in which to build applications of this type in order to support future changes, add-one, modifications, etc.

The server preferably is an open architecture computer that has the ability for failed hardware parts to be replaced swiftly. This configuration also maintains the availability to increase the power of the machine or counter-offer. For example, a computer having an Internal Pentium 400 MHz Processor, with 128 MB SDRAI4, a pair of multi-Giga Byte Hard Drives, a Promise PCIRAID Level 0 Controller or a RAID Level 5 Controller, a 32xCD-ROM, and 3-COM 10-BaseT Ethernet Card is suitable for use in the system.

The platform for use in the system preferably has the ability to work with open database systems, provide a reliable and scalable platform for Internet and line of business applications, and offer breed file and print services that give users easy and effective access to information and resources. For example, Microsoft Windows NT Server 4.0, or 4.0 (Enterprise Edition) system, a powerful multipurpose server operating system, is a suitable platform because of its broad support of many application servers, its scalability to support the system of the present invention and its popularity with developers who create applications of this type. The platform preferably integrates the following services into underlying operating system infrastructure:
  Built-in networking and communication services
  Comprehensive Web services for the Internet and corporate intranets
  Complete platform form for distributed applications
  Enterprise-wide directory services
  Integrated and robust security services
  Easy-to-use and flexible management services.

The system of the present invention preferably uses a web-server, such as Microsoft Internet Information Server 4.0, that offers proven scalability and tight integration with the operating system and other products used in the system. The web server preferably includes publishing features, customizable tools, and technologies that permit the creation of Web pages, the publication of information to the World Wide Web, the sharing of files and data on operating systems such as Windows NT, Novell NetWare and UNIX servers, and over numerous databases, including Microsoft SQL Server, oracle, and Sybase databases, and the search capacity for content in Hypertext Markup Language and Microsoft office document types, and multiple languages.

Preferably, the webserver offers process isolation, a feature which protects applications and Web sites from failure caused by misbehaving components or Web-applications on the server by running them in separate memory spaces. The webserver should also have, when combined with the operating system, built-in distributed application services that automatically scale to serve thousands of simultaneous users.

Preferably, a high performance, open architecture, scalable database, such as Microsoft SQL Server 6.5 or 7.0, is used in the system.

In one arrangement, the computer program is preferably one which provides a scalable platform to deliver high performance Web applications with any major Web server on Windows or Solaris. Allaire ColdFusion Application Server 3.1 and its cooperating ColdFusion Markup Language are suitable for use in developing the system.

In another arrangement, the computer program is preferably one which provides a scalable three-tiered platform to deliver high performance Web applications with any major Web server on Windows or Solaris. The front end is ASP/HTML, the middle tier is Com Object written in C++ or JAVA, and the back end is SQL Server and MTS.

Preferably, the system is hosted at a quality data center, such as a worldwide data center company which provides access to the Internet and monitors the servers to ensure that they are responding to Internet requests.

Although in the basic configuration there are numerous advantages to exclusively dealing with the bottom line, there is a potential disadvantage in some transactions due to using specific, discrete and quantifiable criteria. Namely, lack of flexibility for close transactions. In a given round, the two parties may be very close to an agreement, but unable to consummate it because they are just outside the criteria. However, since the system does not disclose the parties' proposed amounts, they will have no idea how far apart, or close, they are. For example, if, to reach agreement the transaction the differential must be within $10,000, the same result—no agreement—will be reached by the basic system or method whether the differential is $10,005 or $75,000.

Optional Additions

To increase the number of transactions which could possibly be completed, other optional features can be added. In particular, if the opposite parties do not meet the criteria used in normal rounds but are not far off, agreement may still be possible. Through use of a neutral facilitator, a "power round" or a combination of the two additional transactions can be efficiently and expediently completed.

Figure 5:
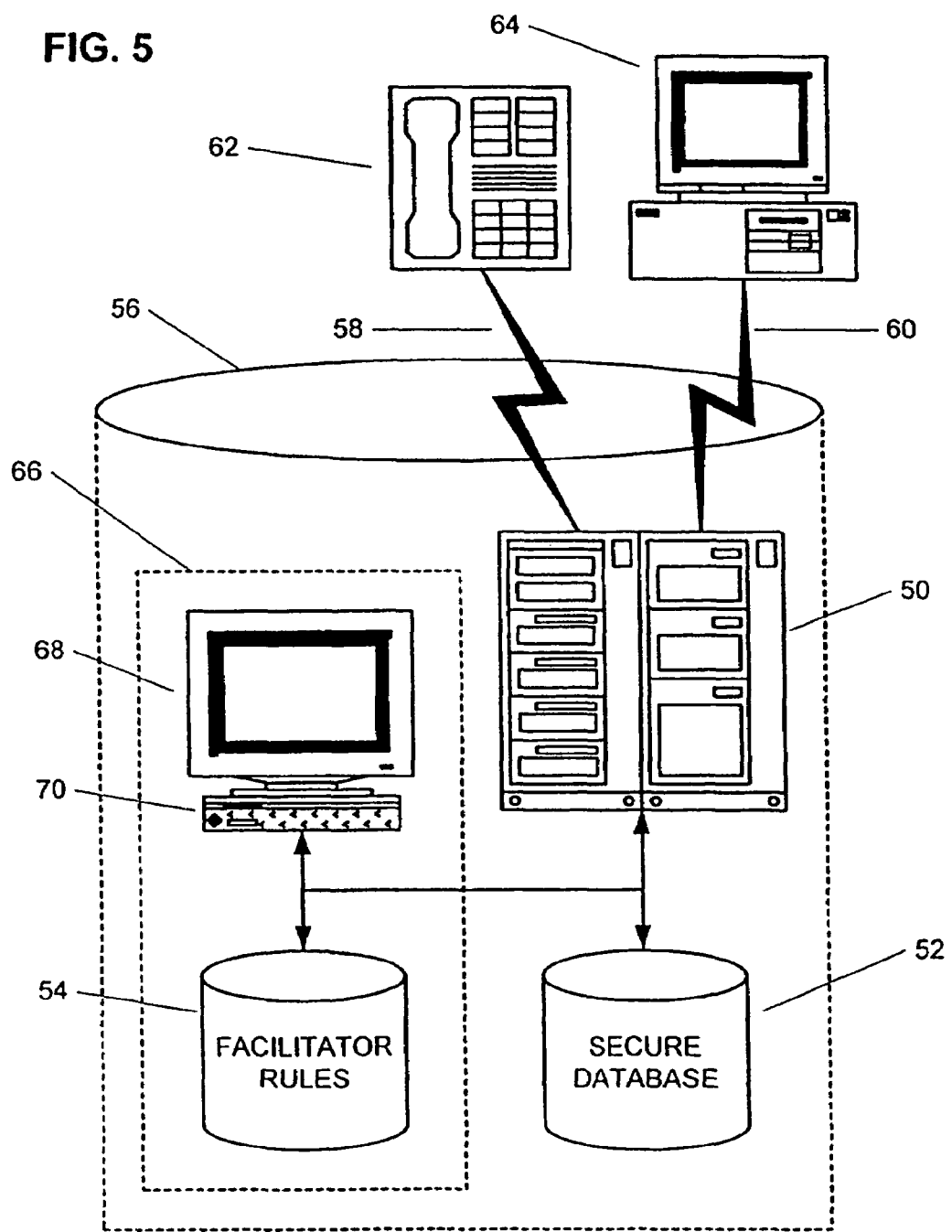
FIG. 5 is an overview of the computerized system including the facilitator.

A facilitator may be optionally employed to communicate a "nudge" to one or more parties to a transaction into submitting a value which is more likely to result in an agreement. The facilitator acts as a neutral automaton, in that it operates in a mechanistic fashion. However, it may in fact be a live person, a computer or some combination of the two. FIG. 5 shows a representative basic system further incorporating the facilitator option. As described above, the system includes a main processor and storage representatively illustrated for simplicity as a server 50 including one or more microprocessors and memory, and an associated secure database 52 stored disk and/or tape accessible to the server. The facilitator option includes, as a minimum, rules or constraints 54 that govern the kinds of encouraging statements that facilitator may use. As shown, the facilitator is implemented so that either the completely automated or partly automated mode may be used. For the completely automated mode, the main processor is guided by programmed rules a constraints and directly communicates with the bargaining entities via the on-line interface 56 illustratively shown connected (by communication links 58, 60) to some entity's telephone 62 and another entity's computer 64. Alternatively a separate facilitator processor 66 may be used to formulate encouraging statements or access available information in order to identify one or more appropriate communications. The facilitator processor 66 communicates with the main processor to provide information for usage by the main processor, either as communicated, or after further formatting or processing. In the simplest transaction the facilitator processor 66 provides communications in a "ready to go" format, and the main processor merely acts as a conduit. In more complex transactions, the main processor may be separately programmed to make further decisions, for example, to select from among provided encouraging statements, or to reformat a selected encouraging statement for communication to one or both entities. The facilitator may also have access to stored information in the secure database, such as offers, counter-offers, prior agreements, geographic information, etc. The facilitator processor 66 may also include a conventional display 68 and input device(s) 70 which allow a live person to act as part of the facilitator 66. The facilitator operates in accordance with a set of prescribed rules, distinct from the criteria for agreement. To perform its function, the facilitator may, in some arrangements, be privy to information in a round that is not revealed to the opposite parties or their representatives. For example, the facilitator may know one or more of: the offer and counter-offer in a given round, the actual numerical differential between the two, the percentage differential between the two, the amount of change or "delta" by either or both entities that would trigger a completion of the transaction, some other information indicative of the potential for agreement, or any or all of the foregoing. Ideally, the facilitator will know the differentials or delta, rather than specific offers or counter-offers, in order to insure disclosure of one party's information to an opposite party does not inadvertently occur, particularly when the facilitator implementation involves a human being. Stated another way, the facilitator has some basis for knowing how close to an agreement the parties are, even if the facilitator does not know specifics for either party's proposed agreement figure in one or more rounds.

In the simplest instance, the facilitator may get involved before the first value is provided by a particular party. In that transaction, the facilitator would likely use information provided by the parties during registration in conjunction with past agreement information to provide a starting point for bargaining. For example, the facilitator might initially communicate with one or more of the opposite parties with a statement regarding the range of past agreements on record for a similar transaction.

By way of example, assume a buyer is purchasing an airline seat from an airline for a specific arrival and departure times and places. The buyer submits the transaction to a bargaining system incorporating a facilitator. The seller believes the airline seat is worth $50.00. Prior to the buyer submitting any values usable in a round, the facilitator encourages the seller with the statement "Similar flights have purchased for between $250.00 and $550.00". The buyer will thus have an indication that their expectation is unrealistic. As a result, the buyer may decide not to pursue the bargained transaction, or may decide to try anyway. As a result of the encouraging, the buyer will ideally provide more realistic offers, thereby increasing the prospect for agreement from the outset.

Alternatively, or in addition, the facilitator could get involved in between one or more rounds. The advantage here is that the facilitator now has available some information relating to the current state of the parties expectations for the particular transaction. Once that information is available, the facilitator would communicate with one or both opposite parties in a neutral fashion in order to induce either or both to adjust their proposal to cause an agreement.

Since it is important that each party's proposed values remain undisclosed to any party opposite the transaction, communications which either directly communicate amounts or deltas or indirectly allow calculation or reasonable estimation of the amounts are most preferably not used. Of course, in particular implementations, there may be an unusual transaction where a more specific communication is warranted, but which might allow a party to reasonably estimate the opposite party's proposed number. Assume, for example, the extreme instance where the two parties' proposals were, respectively, $67,100 and $66,000 and the differential for agreement was agreed to be $1,000. The parties differ by only $1,100. In this instance, a communication to both parties indicating "If you each give in on your amount, you WILL almost certainly have an agreement" would probably tell both parties that they were extremely close to agreement and, hence, allow an estimation of what the other entity had proposed. Nonetheless, in such an extreme transaction, even if the parties were specifically told the proposals they would likely give in to reach agreement. Thus, the prompting or encouraging can significantly increase the chances of an agreement.

In the specific transaction of a human facilitator, guidelines for formulating neutral communications and/or a set of proposed communications to be adhered to would preferably be used in order to limit the exercise of discretion and constrain the actions of the facilitator. This minimizes the possibility that either party's proposal can be estimated or known. In this manner, a greater degree of flexibility is achieved relative to a fully automated facilitator since the human facilitator can exercise some discretion however, that discretion would be limited.

In the transaction of a fully automated facilitator or a human acting in conjunction with computer guidance, the rules or guidelines would preferably be programmed into the computer or part of a facilitator accessible knowledge base. These optional configurations more severely limit the discretion of the purely human facilitator, but the computer guided human still allows one or both parties to have human interaction during bargaining, if it is desirable.

Irrespective of the whether the facilitator is a human being, a computer or some combination of the two, the statements made in the communications should be similar. Depending upon factors such as: the identity or sophistication of the parties, the experience of the parties with the particular bargaining arrangement described herein, geographical considerations, etc., the statements used as prompts or encouragements may be more or less colloquial. Additionally, the statements should generally have a positive or encouraging bias in most instances so as to reassure the parties that the prospect for agreement is good. The following are a few examples considered to be representative, but by no means exclusive or exhaustive, acceptable statements or prompts:

a) "The buyer will increase their offer if you decrease your counter-offer."

b) "The seller has significantly adjusted her counter-offer downward, but the offer must also be increased."

c) "You are close to an agreement but you still must give in some."

d) "Agreement in the next round is a realistic probability if you adjust your [offer/counter-offer]."

e) "The parties are yards, not miles, apart."

f) "The parties should consider reviewing the agreements reached in similar transactions before the next round."

g) "You should consider that during your bargaining two similar transactions were completed, one for $25,000 and the other for $38,000."

As an optional alternative, or supplement, to use of a facilitator, a "power" round may be used. A power round is an additional round which, by agreement of the parties or as a result of an implementation parameter, either gives a slight advantage to one party or changes the rules in a predetermined manner, if the prescribed number of rounds does not cause completion of the transaction. Specifically, a power round may result from a specific agreement between the parties at some point in the process, or be granted based upon application of some system parameter, for example, which party was the first to engage the system for the transaction, the differential in the last round relative to other rounds, some mathematical analysis of the offer and counter-offer in the most recent round(s), the amount one or both parties have adjusted their proposal per round, an analysis of the offer and counter-offer vis-a-vis some statistical data tabulated and/or maintained by the system regarding other agreements, or other suitably implemented consideration(s).

Figure 6:
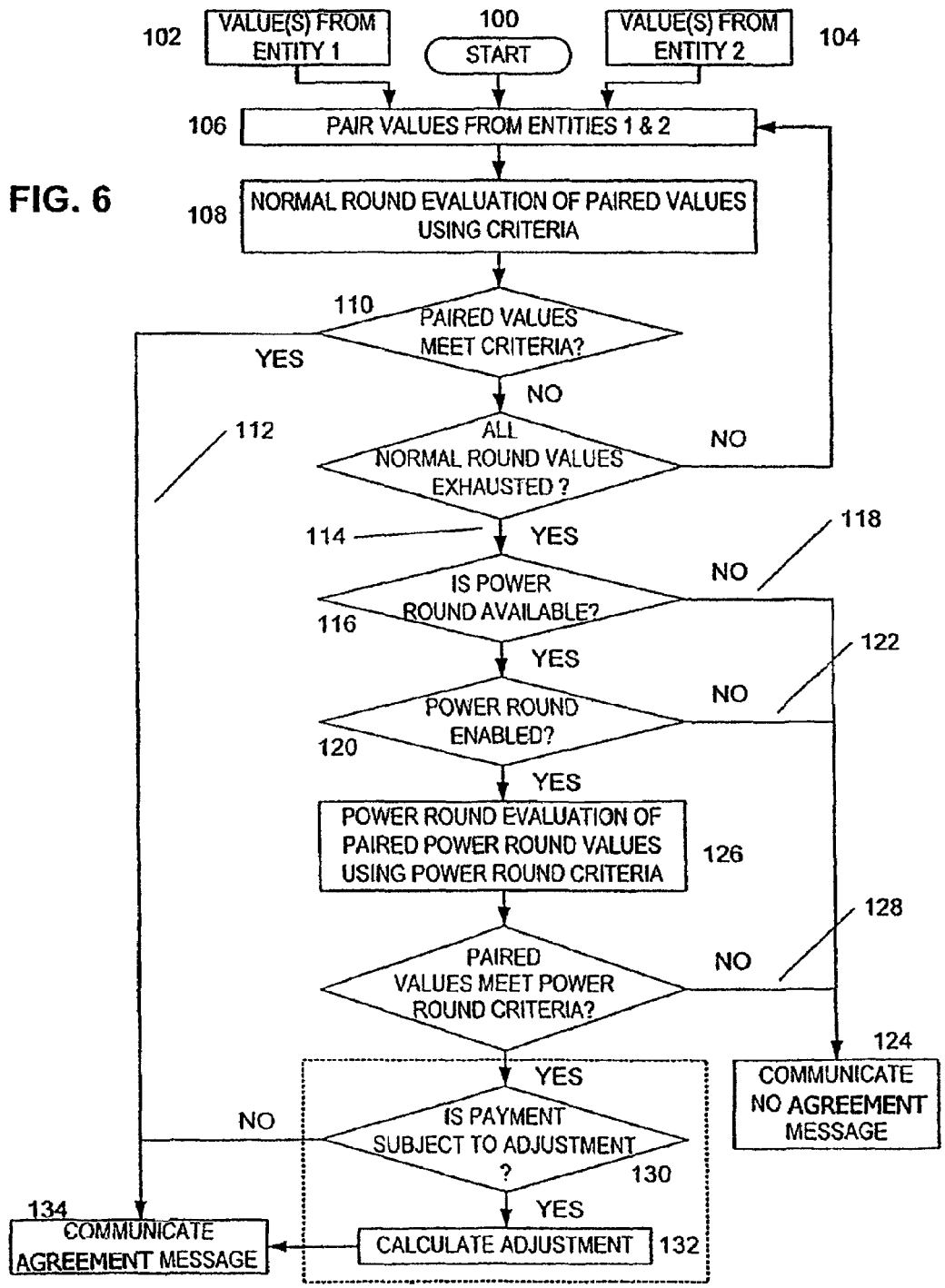
FIG. 6 is a diagram showing program flow from a system perspective for a system including a power round option.

FIG. 6 is shows a simplified program flow when the system includes a power round. The bargaining starts (100) when one entity submits at least one value. Once the system has a value from each entity (if there are only two), the processor receives one or more values from the first entity (102) and for the second entity (104) values are paired (106) and evaluated (108). If a pair satisfy the criteria in the normal manner (110) and an agreement amount is communicated (112). This is essentially the basic system operation described above. If, however, the normal rounds do not result in an agreement, and all the normal rounds have been exhausted (114), the system will check to see if a power round for the bargaining is available (116). If not, the transaction does not reach agreement (118). If a power round is available, the system will then check if a power round is enabled for this particular bargaining (120). Although not required, this allows the system the flexibility to, for example, ask whether one or more entities want to "buy" a power round, invokes a facilitator intervention (if available), prompt for criteria modification or such other modifications or features considered desirable. If the power round is not enabled (122), due to lack of willingness of an entity to buy one, or an inability of the bargaining entities to agree on the criteria, for example, the transaction will not be completed (124). If the power round is enabled, the system will perform a power round evaluation of one or more pairs of values using the power round criteria (126) or a power round guideline agreed to by the parties. As with the normal rounds, if the power round fails, the transaction does not reach agreement (128). If the power round criteria is met, the transaction will be completed. Depending upon the particular implementation, the bargained value may be subject to adjustment. In that instance, the system will optionally further decide whether an adjustment is to be made (130), and what it should be (132). The system then communicates an agreement message (134) in the same general manner described above.

In one exemplary power round, following a three round limit, one party, typically the seller, is prompted to submit a fourth value analysis in conjunction with the last value (in this example, the third) value of the opposite party. In this scheme, the system retains, rather than discards, at least the opposite party's last value from the final normal round until the power round is complete. The seller's fourth submission is then analyzed with the opposite party's value used in the third round against using a specified criteria. Depending upon the particular system, the criteria used in the first through third round can still be used, or a new criteria can be applied. For example, if the criteria applied in the first through third round was a specified percentage, the system could utilize a different criteria, for example, by changing from the percentage differential to a fixed sum differential, widening the percentage differential, increasing the sum differential, or applying some other preselected criteria agreed to by the parties, the particular criteria allowed or applied in the power round vis-a-vis the criteria in a normal round being an implementation choice.

In any event, if the power round criteria is then satisfied, the transaction would be completed. If not, the transaction would not reach agreement. Even with the optional power round, once an agreement is, or is not, reached all offers and counter-offers from all rounds that have not already been deleted are discarded.

Another example of a power round is to allow one party to submit multiple additional values (either offers or counter-offers) which are each applied against the last value submitted by the opposite party, until either an agreement is reached or the party gives up.

Another example of a power round is to change the agreement criteria for the final round. For example, in a five round scenario, the first four rounds would proceed using a common criteria, but for the fifth, a new or modified criteria would be applied. For example, the parties may have agreed that if a fifth round was required, the system would widen the percentage differential by 2%, increase the actual differential upward by $1,000, or allow some specified adjustment to the formula applied, by some predetermined amount. Then, the fifth round would proceed as with the prior four.

In another power round variant, all of the rounds proceed according in the normal manner and, if the result is no agreement, one or more of the earlier rounds are sequentially rerun under a new agreed to criteria. This power round variant requires keeping all the values until either the transaction agreement criteria is satisfied or completion of the power round still does not result in an agreement.

In yet another variant, each of the rounds is rerun but the criteria is incrementally changed. For example, if the parties agree to a 3% widening in percentage each round could be rerun, first with a 1% widening, then with a 2% widening, etc. If at any point the criteria being applied is satisfied, the an agreement is reached. Similarly, a widening by $6,000 could be implemented all at once by an actual widening of $6,000 per round, or for example, by sequential changing the amount in steps by $6,000, $4,000, $2,000 and $1,000 in each of the 1st through 4th rounds or $2,000, $4,000 and $6,000 in a 3 round bargaining.

It is contemplated that still other power round variants may be straightforwardly implemented to similar effect, the important point being the provision of some additional opportunity for agreement using known, although possibly different, parameter(s) compared to a normal round.

As a further implementation detail, it may be desirable to impose some "cost" in return for the power round. For example, if one party gets an advantage in a power round, that party may be required to agree to a previously disclosed adjustment which will be taxed against the ultimate agreement. In other words, in this variant, a party is able to "buy" a power round at a prescribed cost. For example, if the normal payment amount would be based upon the median of the two values that triggered the agreement, a power round bargained payment calculation might involve some adjustment to less than the median for the seller or more than the median for the sponsor or buyer. In other words, assume an agreement was triggered by an offer of $50,000 and a counter-offer of $55,000. In a round where the normal payment amount would be the median, the normal payment amount would be calculated at $52,500. In a power round, the payment might only be $51,250 to the seller because the seller agreed to a $1,250 fixed value adjustment or a calculated adjustment of 50% of the difference between the offer and median in order to buy a power round. Similarly, if the opposite party rather than the seller bought the power round, the payment might be $53,750.

It will be appreciated that, numerous types of adjustments may be made the important point being, there is be some quid-pro-quo on the part of the party buying the power round. Stated another way, this type of power round poses the question: "Would you give in by <some quantity> to have another chance to reach an acceptable agreement?

It will now further be evident that alternative arrangements can combine the use of a facilitator to prompt for the use of a power round or only use the facilitator for a power round. In one scenario, the facilitator might be the one who suggests the power round after a series of unsuccessful rounds. In another instance, the facilitator might suggest changing the criteria for a power round without suggesting a particular change. This would allow for a greater possibility for agreement while not inviting either party to speculate regarding their opposite party's proposals. Thus, the intervention by the facilitator would not affect the neutrality of the system. In yet another instance, the facilitator could intervene immediately upon a power round being "bought" to, for example, provide a statement derived from the tabulated data from prior agreements.

By way of example, a seller buys a power round in return for a $300 decrease in bargained payment. In this power round, the offer from the last round will be compared against a new counter-offer. The last offer was $10,000, the last counter-offer was $11,800, so the difference is $1,800. Assume that, in order to reach agreement, the offer and counter-offer must be within $1,200. The facilitator intervenes with a factual statement, derived from the tabulated data, that: "Over 75% of similar transactions to yours have completed for between $8,500 and $11,000 in this jurisdiction" or "Your last offer/counter-offer was off by more than 15% from the average agreement paid on similar transactions in your jurisdiction." Having received one of these prompts, the seller drops the counter-offer to $11,000 and the transaction reach agreements. In this example, the payment is normally calculated as the median of the offer and counter-offer which satisfied the criteria. Since the agreement resulted from a $10,000 offer and a $11,000 counter-offer, the median is $10,500. However, since the agreement resulted from a power round bought by the seller for a $300 reduction, the bargained payment would be reduced by $300 to $10,200.

Although in the basic arrangement, the agreement criteria may also differ among rounds, in some instances it is desirable to enforce a mandatory tier structure, which changes the criteria applied, based upon the counter-offer or offer amount.

For example, the system can be set up so that for a counter-offer or offer below $10,000, the agreement criteria may be one or both of 30% or $2,500. If either the offer or counter-offer equals or goes over $10,000, the criteria changes to 30% or $5,000. If either the offer or counter-offer equals or exceeds $25,000 the criteria may change to one or both of 35% or $8,000. Of course, the specific cut-off point, range within which a criteria applies, or the particular percentage and/or differential amount used within a range may vary from system to system or bargaining transaction to bargaining transaction. Moreover, in some instances it may be desirable to allow one or more parties to specify the particulars for one or more of the above.

Depending upon the implementation, it is possible for a particular counter-offer to fall within one range and an offer to fall in another range. In that transaction it is preferable to require that the differential between either a) max exposure and minimum gain satisfy the broadest criteria, or b) actual differential between offer and counter-offer satisfy the broadest criteria. Alternatively, prioritizing the usage of exposure/gain versus offer/counter-offer, prioritizing one criteria over another, or requiring satisfaction of both criteria can be employed.

In some instances, particularly when the agreement amount is calculated to be the median, usage of a tiered arrangement can result in an agreement amount being higher than a maximum exposure or, depending upon the other options employed go below the minimum gain.

An example of such a scenario is shown in Table 2.

TABLE 2

| Submission | Criteria | Specifics |
|---|---|---|
| $10,000 | "A" | 30% or $2,500 |
| $10,000 | "B" | 30% or $4,000 |
| $85,000 | "C" | 35% or $10,000 |

| Round | Offer | Counter-offer | Criteria | Exposure/Gain | Result |
|---|---|---|---|---|---|
| 1 | $6,000 | | A | $6,900 | No Agreement |
| | | $13,000 | B | $11,050 | No Agreement |
| 2 | $8,000 | | A | $9,200 | Agreement |
| | | $12,000 | B | $10,200 | Agreement |

In the above scenario, criteria A applied in both rounds for both offers because the never exceeded $10,000. Similarly, criteria B applied in both rounds for the counter-offers because they both were greater than $10,000. There was no agreement in round 1 because neither the actual offer and counter-offer nor the exposure/gain met the specified criteria.

In round 2, an agreement was reached because the $4,000 differential criteria was met by the offer and counter-offer and both the A and B criteria were satisfied by the exposure/gain differential.

Since the exposure/gain governs the maximum to be paid or minimum to be received, using the median of the $8,000 offer and $12,000 counter-offer would result in a payment of $10,000. However, since the maximum exposure based upon the $8,000 offer is $9,200, the payment amount will be set equal to that exposure rather than the median. In the reverse transaction, the payment amount would be no less than the minimum gain.

As a further alternative with the tiered arrangement, if the maximum exposure and minimum gain are equal, that condition could be used as a further or alternative agreement criteria. Depending upon the implementation a match between minimum gain amount and maximum exposure could be set automatically trigger an agreement and override any other specified criteria. In the transaction of a match between exposure and gain, that value would also override the payment amount calculation.

As described herein, sponsors and agents may maintain an account with the provider of the bargaining system if they expect to submit transactions for bargaining with some regularity. However, it is well known agents can take high commissions for bargained transactions as well as fees, expenses and/or disbursements. Advantageously, since the system is directly accessible to non-agents on-line, for example, via the internet or telephone, bargaining is directly available to the individual without the normal risks or problems which can arise from a person acting as their own agent. As a result, sellers and opposite parties may each benefit in one or more of the following ways.

There are four potential buyer benefits which can specifically result from a buyer directly initiating entry of their transaction for automated bargaining in the first instance. First, since the system does not deal with personalities or sales tactics, only the bottom line, a buyer need not be sophisticated, knowledgeable in sales tactics or a capable negotiator in order to obtain an acceptable agreement. Second, the buyer is not subject to a commission or other costs, although they might be charged some "engagement fee" as evidence of good faith or to discourage the submission of insincere transactions. In keeping with the on-line implementation aspect, the engagement fee will likely be chargeable to a credit card number submitted by the directly engaging party. Alternatively or additionally, the engagement fee could be returnable if an agreement is reached, for example, if a sponsor agrees to pay a fixed fee if the transaction is negotiated using the system or an agreement is reached using the system. Third, the transaction may be resolved much faster than would be the transaction through conventional bargaining routes since the buyer has greater control over the bargaining since they present the counter-offers rather than authorizing an agent to reach agreement for no less than a specified amount. Finally, in some instances, a seller may be unaware of the potential value of their transaction and thus submit counter-offers, leading to agreement, well below what the buyer would pay thorough conventional bargaining channels.

There are also at least four potential benefits when a seller initiates the automated bargaining process for a given transaction. First, as with buyers, since the system does not deal with personalities or sales tactics, only the bottom line, a seller need not be sophisticated, knowledgeable in sales tactics or a capable negotiator in order to obtain an acceptable agreement. Secondly, in some instances, a buyer may also be unaware of the potential value of their transaction and thus submit counter-offers, leading to agreement, well above what the seller could have received thorough conventional bargaining channels. Further, since a seller can engage the system directly, rather than through an agent, the prospect of a quick agreement goes up because delays due to backlogs or inattentiveness of agents to smaller transactions in favor of larger ones are eliminated. Finally, as will be discussed in greater detail below, use of the system may result in the seller receiving their payment faster and/or more conveniently.

Parties can be attracted to the system using conventional print, radio and television media, word of mouth, links on websites, partnerships with portals or web based companies, and/or through affinity program arrangements.

For example, airline companies may offer incentives in the form of discounts on tickets to buyers who directly engage the system. Alternatively, affinity programs can be arranged with entities such as airlines or credit card companies so that, if an agreement is reached, the seller will receive frequent flyer mileage or a debit card for the amount of the agreement. Other suitable partnerships and affinity arrangements can be set up, for example, with entities in the travel, investment, banking, automobile, publishing, housing or big ticket item businesses. Depending upon the particular circumstance a payment between bargaining system provider and the affinity program partner may be involved.

Another optional variant provides a further incentive to a party to initiate entry of a transaction for automated bargaining. In this variant, if initial entry of a transaction is a result of a direct contact, the party submitting the transaction is identified as an initiator. The system logs that fact for later use if an agreement is reached. The rounds proceed according to the particular implementation used. If an agreement is reached in a particular round however, instead of calculating an agreement amount according to the normal formula, a transaction bargaining payment using a different formula is used which favors the initiator or alternatively a windfall amount adjustment is made to the normal payment amount which would normally be used when there was no "initiator". An example of a no "initiator" instance is when the transaction is first submitted by an agent who has an account with the system.

Depending upon the implementation, it may be desirable to require the buyer to "escrow" proceeds such that if an agreement is reached, the risk of post-agreement default is reduced. One way this can be accomplished, for small matters, is by putting through a charge in a specified escrow amount on their charge/credit or debit card. Another way to accomplish this purpose is to require the person to transfer funds from an account they hold into an escrow account maintained expressly for this purpose.

In order to reasonably assess the amount necessary for escrow, the system can utilize the transaction information provided to identify similar transactions where agreements have been reached and, using that information, calculate an estimation of the required escrow amount sufficient to meet an agreement, if reached. The system is also preferably set up to credit any overage amount back to the buyer's credit card or account if the agreement figure reached is less than the escrow.

By way of example, a seller seeking to sell an antique sees an article on a consumer oriented website about automated transaction bargaining. This causes the seller to go to the identified website which acts as an Internet interface to an automated bargaining system. The seller submits the transaction to the system and is charged an engagement fee of $75. Since the seller directly contacted the system and the opposite party's agent has not previously submitted this particular transaction to the system, the seller is flagged in the system as an initiator. At some time thereafter, the insurer agrees to also use the system for that transaction. The parties agree to a number of rounds and an agreement criteria, submit their respective values and the transaction reach agreements as a result of the analysis in the second round. The system is set up so that a normal payment amount would be the median of the value submitted by the opposite parties. However, as part of the calculation function, the system identifies that the initiator flag is set for the seller. As a result, the payment is calculated differently so as to provide a windfall benefit to the seller. For example, the seller may receive the offer amount, an amount specified by a new formula, some percent in excess of the median amount, a fixed amount bonus, or the median might be used in place of the lower of the offer or counter-offer in the particular formula, so as to provide a higher payment to the seller relative to what the seller could have obtained in the normal transaction.

In a similar vein, if two parties to a transaction are both individuals and the opposite party is the initiator, the "windfall" would be in the form of a reduced payment amount relative to a normal payment amount.

In still other implementations, the "windfall" may only be invoked if there is an initiator and the counter-offer and offer have crossed or pass each other, i.e. in one round the offer is less than the counter-offer and in the next round the offer is more than the counter-offer. In such a situation, the simplest windfall benefit to set the bargained payment to the initiator seller equal to the full offered amount rather than the calculated normal payment amount. Conversely, the simplest windfall for the initiator opposite party is to set the payment they will make equal to the counter-offer.

It will be recognized that the specific windfall adjustment will depend upon the particular implementation used. Accordingly, the important aspect is that the system keeps track of whether a particular party is an initiator and there is some benefit which can accrue to the initiator when an agreement is reached.

Figure 7:
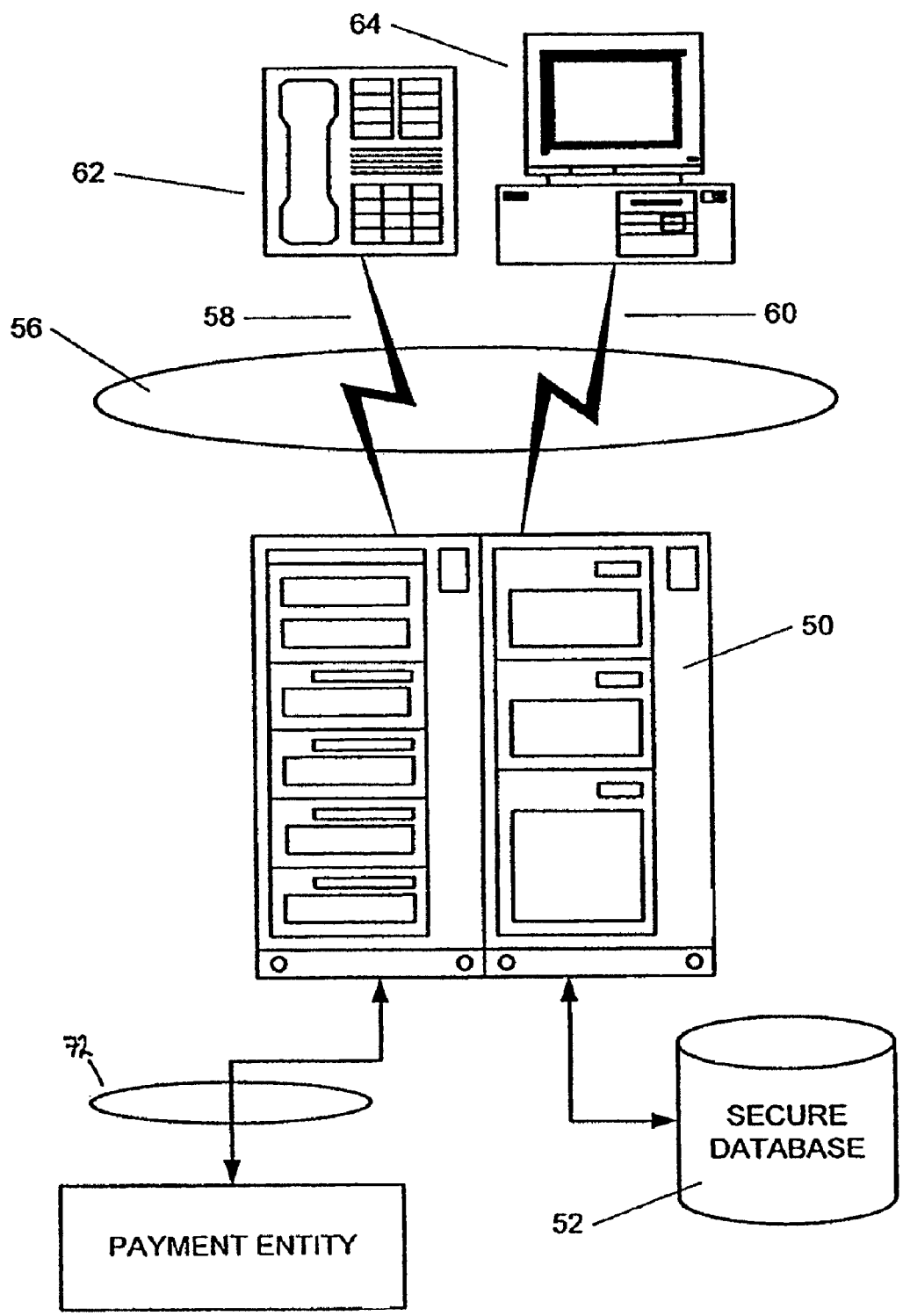
FIG. 7 is an overview of the computerized system including the direct payment interface option.

A further advantage flowing, in part, from the on-line nature of the system is the ability to automatically provide immediate payment to a seller or initiate an immediate transfer of the bargained payment or value when an agreement is reached. The system FIG. 7 is a simplified system variant which includes an interface 72 to effectuate payment to the seller automatically. For example, the interface 72 may be to a payment card account system such that if an agreement is reached, and the seller is a registered cardholder the seller's credit/debit/charge/entertainment card is automatically credited with the agreement amount. Similarly, if the seller has a smart card, stored value card, online creditable purse or module, or other on-line accessible way for the recipient to automatically (and preferably directly) receive the transfer, the system may be configured to automatically credit it with the agreement amount. Given the numerous ways known to transfer or receive value on-line and the rate of growth in new ways to do so, it will be appreciated that the basic principle is the automatic provision or transfer of value, not the particular scrip, protocol or device used to do so.

Alternatively, the seller may provide the system with an account number into which a wire transfer of the funds may be automatically transferred.

In some instances, the interface is merely a pre-configured vehicle for communicating with an authority in order to inform the authority that a transfer is to be made. In this manner suitable arrangements may be made so that the system can convert the agreement into a non-monetary payment-in-kind or transfer. For example, through an arrangement with an airline frequent flyer program, or other program offering "points", the agreement can be converted into the appropriate amount of miles or points. Alternatively, the agreement may involve a non-monetary agreement figure which can automatically initiate a transfer of stocks, bonds, commodities, precious metals, gems, etc., lodged with an escrow agent. In such transactions, the value provided by the opposite party must be at least equal to the highest offer they will present. In the event of an agreement, the appropriate amount is calculated as the agreement figure and automatically transferred to the seller. For example, in the transaction of stocks, the shares will be automatically registered in the name of the seller. In the transaction of precious metals, an account will be automatically opened in the seller's name and a suitable amount will automatically be credited to that account. It will be recognized that, consistent with the description herein, automated bargaining would be extensible to apply to other payment-in-kind situations in a straightforward manner.

It may also be desirable to implement the system such that, in response to an agreement, an automatic transfer of title or an ownership interest in something is initiated, for example in the case where the transaction is for real property and the payment may be made by transfer of title in the property from one to the other party. In such a transaction, suitable documents authorizing the transfer will be executed but not filed. If an agreement is reached, the system will automatically notify the appropriate entities and provide the necessary documents to effectuate the transfer with a minimum of seller involvement.

Additionally variants may initiate issuance of some insurance product, such as an annuity or a fully paid up insurance policy in the agreement amount.

One possible drawback to a system which allows a seller to directly engage the system is the seller's potential fear that, even if an agreement is reached, agent or attorney involvement may be required in order to consummate the agreement. Advantageously, the system may be optionally constructed to address that concern. In particular, the system may be constructed to automatically generate agreement documents when an agreement is reached. As described above, when the parties engage the system one or more of the parties provide transaction specific information. The system contains a number of templates which can be used to generate agreement documents appropriate for the transaction. For example, an agreement and/or release can be generated by extracting the appropriate information provided for the transaction and incorporating it into the template. Similarly, if sufficient information is provided for a transaction currently pending in a court, the system can use a suitable template to generate a stipulation and/or order of dismissal with prejudice, in accordance with the requirements of the particular jurisdiction. Once generated, the document can be accessed in a form conducive to printing and immediate execution or in a text format which allows further additions and/or modifications to be made to conform to local rules or custom. In the broadest sense, the on-line document feature can be likened to having an automated clerk make a trip to the local stationery store for the appropriate legal form and type in the appropriate information. Alternatively, particular jurisdictions may restrict the form and type of document provided. As a result, the system is preferably constructed so as to take into account any such limits and restrictions within that jurisdiction and provide all appropriate disclaimers in that regard.

Multiparty Aggregation Options

Many multiparty bargains can be directly handled as a group of two party bargains as set forth above. However, in some transactions, particularly when the transaction involves a single entity against a group of entities for a transaction, aggregation of the group's individual offers or counter-offers can simplify processing.

Depending upon the particular system, the aggregation can be fully or partly blind to some or all of the parties. For example, if a seller has a transaction against three separate parties (collectively "the group"), the group can be linked such that the system will still accept individual submissions from each. However, once received, individual submissions from each member of the group will be added to corresponding submissions of the others in the group to form one or more sets of aggregate values. The system is "fully blind" because the individual members of the group are not informed that the aggregation is being performed. An aggregate value is used in the system as if it was an offer or counter-offer submitted by a single entity. In this system, an "AggregateValues" module can be created which sums individual values from different entities sharing a common opposite party for a transaction.

The system will compare the aggregate value against an opposing offer or counter-offer as described above. In other words, once aggregated, the bargaining can proceed as if it was a two party bargaining—because from the system perspective at that point, it is.

It is important to note that, as with the two party bargaining, values submitted by all members of the group are not disclosed to their opposite party. Similarly, the system does not disclose the opposite party's submission to any member of the group. Depending upon the particular system configuration, the submissions from individual members of the group may not be disclosed to any other member of the group.

In the transaction of a fully blind aggregation arrangement, individual submissions are not revealed to anyone other than the party making that submission.

An example of a fully blind bargaining is shown in Table 3:

TABLE 3

Reach agreement if (aggregate) offer is at least 75% of counter-offer Fully Blind (i.e. Party 1, 2 & 3 and seller do not know offers are combined.

EXAMPLE 1:
ROUND 1

| Buyer (s) | | Seller |
|---|---|---|
| Party 1 | Offer $10,000 | |
| Party 2 | Offer $15,000 | |
| Party 3 | Offer $35,000 | |
| | Total $60,000 | Counter-offer = $65,000 |
| | Transaction reach agreements for $62,500 | |
| Party 1 contributes $10,416.67 (10,000/62,500 .times. $62,500) | | |
| Party 2 contributes $15,625.00 (15,000/62,500 .times. $62,500) | | |
| Party 3 contributes $36,458.33 (35,000/62,500 .times. $62,500) | | |

EXAMPLE 2:
ROUND 1

| Buyer | Sellers | |
|---|---|---|
| | Party 1 | Counter-offer $25,000 |
| | Party 2 | Counter-offer $18,000 |
| | Party 3 | Counter-offer $35,000 |
| Offer = $70,000 | | Total $78,000 |
| Transaction reach agreements for $74,000 | | |
| Party 1 receives $23,718 | | |
| Party 2 receives $17,077 | | |
| Party 3 receives $33,205 | | |

A partially blind arrangement allows the group access to each other submissions. To prevent escalation in submissions by one individual based upon the submission of another on the group, it is desirable to only allow an individual access to the submissions of others in the group after all the individual values have been submitted and the values have been locked against withdrawal or change.

An example of this type of partially blind bargaining is shown in table 4:

TABLE 4

Reach agreement if counter-offer and offer differ by less than $2,500 Partially Blind (i.e. Party 1, 2 & 3 know each others offers after all submitted)

| Buyer (s) | | Seller |
|---|---|---|
| ROUND 1 | | |
| Party 1 | Offer $5,000 | |
| Party 2 | Offer $12,000 | |

TABLE 4-continued

Reach agreement if counter-offer and offer differ by
less than $2,500 Partially Blind (i.e. Party 1, 2 &
3 know each others offers after all submitted)

|  | Buyer (s) | Seller |
| --- | --- | --- |
| Party 3 | Offer $9,000 | |
| Party 4 | Offer $11,500 | |
| | Total $37,500 | Counter-offer = $50,000 |
| | NO AGREEMENT | |
| | ROUND 2 | |
| Party 1 | Offer $10,000 | |
| Party 2 | Offer $15,000 | |
| Party 3 | Offer $10,000 | |
| Party 4 | Offer $13,500 | |
| | Total $48,500 | Counter-offer = $45,000 |

Transaction reach agreements for counter-offer amount of $45,000
Party 1 contributes $9,278.35
Party 2 contributes $13,917.53
Party 3 contributes $9,278.35
Party 4 contributes $12,525.77

Another partially blind arrangement allows the group to fully collaborate on a collection submission. In this transaction, the opposite party is informed that the offer or counter-offer is being submitted on behalf of party 1, party 2, etc. The opposite party then has the option of accepting or declining. If the opposite party accepts, and an agreement is reached, the transaction will be completed for all parties in the group and their opposite party.

An example of this type of multiparty bargaining is shown in table 5.

TABLE 5

Reach agreement if (aggregate) offer is at least 75% of counter-offer
Partially Blind (i.e. Party A, B & D collectively submit offers
as single values and seller is informed, "You have a transaction
against Entities A, B, C & D. Offers are being submitted by Entity
A on behalf of Entities A, B & D. Entity C declines to participate,
if an agreement is reached you may be able to independently pursue
your transaction against Entity C."

| Round | Aggregate Offer | Seller's counter-offer | Result |
| --- | --- | --- | --- |
| 1 | $100,000 | $295,000 | No Agreement |
| 2 | $110,000 | $230,000 | No Agreement |
| 3 | $120,000 | $160,000 | Reach agreement for $140,000 |
| 4 | $128,000 | $140,000 | |

Entities A, B and D can then work out among themselves the apportionment, specify an apportionment so that the system will calculate an amount owing for each, or apportion amount equally among all participants.

In still another variant, once presented with the list of parties making up the group, the opposite party has the option of declining to negotiate with the group, but designating some members of the group with whom they will negotiate as a group. In this manner, a seller gets the ability to "opt out" one or more particular buyers, so as to attempt to bargain individually with them, and a buyer gets to opt out one or more sellers, to prevent one or more individuals, for example, those with a history of failing to provide the bargained for item.

The aggregations may also be independently performed on both sides of a transaction. Thus, a group may submit offers for comparison against another group's counter-offers. Depending upon the particular implementation, the aggregation arrangement on one side of the transaction need not be the same as the aggregation performed on the other side of the transaction. In other words, offers may be submitted partially blind for comparison against counter-offers aggregated in a fully blind arrangement.

In any transaction, if an agreement is reached, if the group whose submissions were aggregated will pay on the transaction, the payment will preferably be on a pro-rata proportional share. Alternatively, in some implementations, the members of the group can specify a payment allocation other than on a pro-rata basis.

If the group is made up of individual parties who will receive payment, depending upon the particular system, the parties will each receive their respective counter-offers, rather than some median. Alternatively, additional modules can be created which perform more complex apportionment or allocation of payments to sellers.

Additional Options

Since the internet is a globally accessible media, particular embodiments may include a "ConvertEquateLocalCurrency" module created to allow opposite parties to submit offers or counter-offers in their local currency for comparison, even if the offers are submitted in one currency and the counter-offers in another. In this manner, each party can deal with a currency with which they are comfortable, thereby making the bargaining even more user friendly. Where disparate currencies are used, to analyze the offers and counter-offers the system will convert the all the currencies specified to a common currency, which may or may not be the same currency as the offers and counter-offers, for comparison. By way of example, if the offers were submitted in Japanese Yen and counter-offers submitted in Italian Lira, the system might use Yen, Lira, or some third currency, for example U.S. Dollars, Euros, or even Thai Bhat, depending upon the particular implementation.

In a similar vein, an arrangement may be made with a currency exchange entity so that, if an agreement is reached, the seller can be paid in the currency of choice, irrespective of the currency the opposite party used to submit offers. For example, a Greek national submitting offers or counter-offers in U.S. dollars may specify automatic payment by crediting their Athens bank account in Drachmae.

Other optional features include a "StructurePayment" module which will calculate a structured payment from the agreement amount in accordance with specific guidelines submitted buy a party. In this manner, spendthrift sellers can protect themselves by specifying that the payment not be provided as a lump sum, but rather incrementally over time. Coupled with one of the above payment options, the agreement could advantageously make monthly transfers to a stored value module, a credit card, a bank or brokerage account, quarterly payments to an insurance policy, or such other arrangements as the system provider can arrange.

Other optional features include the use of different types of communications links (e.g. optical cables or wireless connections); distributed databases; state machines; combinations of secure and non-secure servers; distributed processing; or implementing certain options such as indicators or particular functions in hardware vs. in software and vice versa. Similarly, the principles may be implemented using different types of storage such as tape, solid state, optical, magneto-optical, etc., instead of, or in addition to those described herein.

It should be understood that the above description is only representative of illustrative embodiments. For the convenience of the reader, the above description has focused on a representative sample of all possible embodiments, a sample that teaches the principles of the invention. The description has not attempted to exhaustively enumerate all possible variations or even combinations of those variations described. That embodiments may not have been presented for a specific portion of the invention, or that further undescribed embodiments may be available for a portion, is not to be considered a disclaimer of those embodiments. One of ordinary skill will appreciate that many of those undescribed embodiments, involve differences in technology rather than differences in the application of the principles of the invention. It will be recognized that, based upon the description herein, most of the principles of the invention will be transferable to other specific technology for implementation purposes. This is particularly the transaction when the technology differences involve different specific hardware and/or software. Accordingly, the invention is not intended to be limited to less than the scope set forth in the following transactions and equivalents.

What is claimed is:

1. An automated method for bargaining in a round by round manner to achieve a binding bargained payment for a transaction, said method being capable of multiple rounds comprising:

configuring for at least one computer and at least one computer readable medium storing thereon computer code which when executed by the at least one computer performs the method, the method comprising, accepting one or more offers for sale from at least one first party and one or more offers to purchase from at least one second party, wherein the computer is configured to accept offers from a party either round by round or to accept more than one offer from a party before the completion of any round;

automatedly comparing the offers round by round, wherein each such offer corresponds to a sequential round; and automatedly analyzing the offers by automatedly comparing the offers corresponding to a first round to determine if they satisfy a predetermined criterion for achieving a binding agreement; and if the first round offers satisfy the criterion, providing a response to at least one of the parties that indicates that the comparison analysis has produced an agreement on a binding bargained payment that is calculated as a function of at least one of the offers in the first round;

if, however, the analysis of the offers indicates that the first round offers do not satisfy the criterion for the first round, then, permitting the parties on both sides of the transaction to engage in at least one subsequent round by submitting at least one offer after the first round has been completed or based on the submission of a second round offer before the completion of the first round;

automatedly analyzing the offers then in the second round by comparing the offers for that round and determining if they satisfy the criterion for that round; and if the offers for that round satisfy the criterion for that round, providing a response to at least one of the parties that indicates that the comparison analysis has produced a binding bargained payment calculated as a function of at least one of the offers for that round;

if, however, the offers in that round do not satisfy the criterion for that round, conducting any number of subsequent rounds, wherein the at least one computer is configured such that during a given round no indication of the amount of any offer from one party for that round is provided for use by the party on the opposite side of the transaction and wherein said automation is implemented by a computer, and the automated analysis and comparison is completely automated, and wherein the at least one predetermined criterion includes at least one criterion allowing for achieving the binding agreement when the offer for sale is greater than the offer for purchase.

2. A method according to claim 1 wherein for at least one of the rounds, the predetermined criterion applied is a specified percentage difference between the offers in that round.

3. A method according to claim 2 wherein a specific percentage difference amount is applied.

4. A method according to claim 2 wherein the percentage difference applied is from about 5% to about 50%.

5. A method according to claim 2 wherein the same percentage difference is applied for one or more of the rounds.

6. A method according to claim 1 wherein for at least one of the rounds, determining whether the offers satisfy the criterion for that round is accomplished by determining whether the offers differ from one another by a specified amount or percentage.

7. A method according to claim 6 wherein the criterion applied is a specified amount.

8. A method according to claim 6 wherein the same specified amount is applied as the criterion for one or more than one round.

9. A method according to claim 1 wherein for at least one round, the method includes: a) determining whether the offers satisfy the criterion for the round, by multiplying one of the offers by a predetermined factor to produce a result; b) comparing that result with the offer of a party on the opposite side of the transaction; and c) determining whether the outcome of the comparison falls within a predetermined range.

10. A method according to claim 9 wherein the criterion applied is a predetermined range within which offers need to be to produce a binding bargained payment.

11. A method according to claim 1 wherein for at least one round, the criterion applied to produce a binding bargained payment is a function of at least one of the offers in that round.

12. A method according to claim 1 wherein a response that a binding bargained payment has been achieved is provided to all parties.

13. A method according to claim 1 which further comprises providing the response to at least one first party and at least one second party that a binding bargained payment has not been produced in that round.

14. A method according to claim 1 which further comprises before commencing the second or subsequent round, informing the parties if the offers do not satisfy the criterion for the first or previous round.

15. A method according to claim 14 which further comprises informing the parties if the offers in a subsequent round do not satisfy the criterion for that round before commencing a further subsequent round.

16. A method according to claim 1 wherein three rounds are conducted.

17. A method according to claim 1 wherein the criterion is changed in a round so that the binding bargained payment is calculated as a function of at least one of the offers in that round.

18. A method according to claim 1 which further comprises a login procedure so that only parties with proper authentication data can log in.

19. A method according to claim 1 which further comprises communicating with at least one of the first and second parties through a network.

20. A method according to claim 19 wherein the communication with said first and second parties is via the Internet.

21. A method according to claim 1 wherein the offers are monetary.

22. A method according to claim 21 wherein when the monetary offers are in different currencies, applying a currency converter to convert the monetary offers into a common currency in order to permit a comparison thereof.

23. A method according to claim 1 which further comprises sending one or more predetermined messages to the parties when the outcome of the comparison of offers fails to satisfy the predetermined criterion but is within a predetermined acceptance limit.

24. A method according to claim 23 wherein a facilitating message is sent.

25. A method according to claim 1 wherein a plurality of offers are submitted by at least one party prior to the completion of the first round.

26. A method according to claim 1 wherein before the completion of any given round, one offer or a plurality of offers is submitted by at least one party, one such offer corresponding to the present round and each such other offers corresponding to sequential rounds.

27. A method according to claim 1, which further comprises:
   activating at least one power round, wherein the power round is activated by at least one party of the transaction, if no binding bargained agreement is reached after an agreed upon number of rounds has failed to generate such agreement;
   sending an inquiry to the parties inquiring whether one or more parties want to engage in a power round; and
   if at least one affirmative answer is received, applying either the same or a different criterion for the power round.

28. A method according to claim 27 wherein the power round criterion applied is the same criterion used in one of the preceding rounds.

29. A method according to claim 27 wherein the power round criterion applied is different from the criterion of one or more of the preceding rounds.

30. A method according to claim 27 wherein the power round is activated by the purchase of the power round.

31. A method according to claim 27 wherein how the binding bargained payment is calculated is changed to be a function of at least one of the offers in that round.

32. A method according to claim 27 wherein the method further comprises configuring the at least one computer to allow a different predetermined criterion to be applied, if desired, to at least one round subsequent to the first round.

33. A method according to claim 32 wherein the criterion used in one or more of the rounds is changed from that initially applied.

34. A method according to claim 33 wherein the criterion used in the rounds is changed in response to a request received from at least one of the parties.

* * * * *